(12) United States Patent
Watanabe et al.

(10) Patent No.: US 8,808,824 B2
(45) Date of Patent: Aug. 19, 2014

(54) OPTICAL INFORMATION RECORDING MEDIUM, METHOD OF RECORDING INFORMATION AND AZO METAL COMPLEX DYE

(75) Inventors: Kousuke Watanabe, Odawara (JP); Taisuke Fujimoto, Odawara (JP); Tetsuya Watanabe, Odawara (JP); Masashi Ogiyama, Odawara (JP); Seiji Hatano, Odawara (JP); Taro Hashizume, Odawara (JP); Hirokazu Hashimoto, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 765 days.

(21) Appl. No.: 13/120,884

(22) PCT Filed: Sep. 25, 2009

(86) PCT No.: PCT/JP2009/004887
§ 371 (c)(1),
(2), (4) Date: Mar. 24, 2011

(87) PCT Pub. No.: WO2010/035483
PCT Pub. Date: Apr. 1, 2010

(65) Prior Publication Data
US 2011/0177281 A1 Jul. 21, 2011

(30) Foreign Application Priority Data

Sep. 25, 2008 (JP) ................................. 2008-245771
Mar. 4, 2009 (JP) ................................. 2009-050910

(51) Int. Cl.
*G11B 7/24* (2013.01)

(52) U.S. Cl.
USPC .................... 428/64.4; 428/64.8; 430/270.16; 534/710

(58) Field of Classification Search
CPC .. G11B 7/2467; G11B 7/2492; G11B 7/2495; G11B 7/24079; G11B 2007/24612; C09B 45/18; C09B 45/22
USPC ............. 428/64.4, 64.8; 430/270.16; 534/710
See application file for complete search history.

(56) References Cited

U.S. PATENT DOCUMENTS

| 7,754,863 | B2 * | 7/2010 | Bacher et al. ................. 534/698 |
| 8,092,890 | B2 * | 1/2012 | Watanabe et al. ............. 428/64.8 |
| 2008/0081286 | A1 * | 4/2008 | Watanabe et al. ........... 430/281.1 |
| 2009/0053455 | A1 | 2/2009 | Miyazawa et al. |
| 2011/0202942 | A1 * | 8/2011 | Fujimoto et al. .............. 720/718 |

FOREIGN PATENT DOCUMENTS

| JP | 11-130970 | 5/1999 |
| JP | 11-310728 | 11/1999 |
| JP | 2000-168237 A | 6/2000 |

(Continued)

OTHER PUBLICATIONS

International Preliminary Report on Patentability dated May 19, 2011 for PCT/JP2009/004887.

*Primary Examiner* — Gerard Higgins
(74) *Attorney, Agent, or Firm* — Sughrue Mion, PLLC

(57) ABSTRACT

An aspect of the present invention relates to an optical information recording medium comprising a recording layer on a surface of a support, wherein the surface of the support has pregrooves with a track pitch ranging from 50 to 500 nm, the recording layer comprises an azo metal complex dye being a complex of six azo dyes and seven transition metal ions. A further aspect of the present invention relates to a method of recording information onto the optical information recording medium and a novel azo metal complex dye.

20 Claims, 1 Drawing Sheet

(56) References Cited

FOREIGN PATENT DOCUMENTS

| | | |
|---|---|---|
| JP | 2001-158862 A | 6/2001 |
| JP | 2002-274040 A | 9/2002 |
| JP | 2006-142789 A | 6/2006 |
| JP | 2006-256294 A | 9/2006 |
| JP | 2006-306070 A | 11/2006 |
| WO | 2008/038765 A1 | 4/2008 |
| WO | 2008/108406 A1 | 9/2008 |

\* cited by examiner

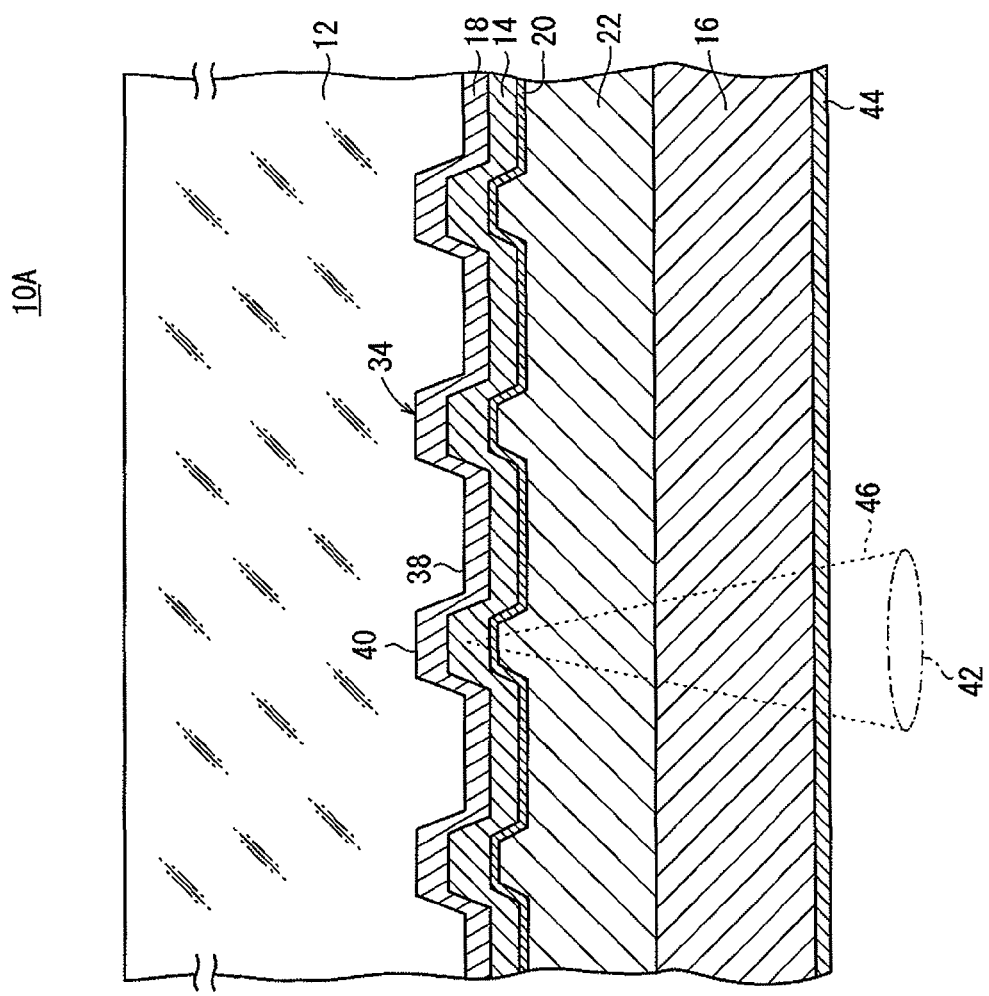

OPTICAL INFORMATION RECORDING MEDIUM, METHOD OF RECORDING INFORMATION AND AZO METAL COMPLEX DYE

CROSS-REFERENCE TO RELATED APPLICATIONS

This application claims the benefit of priority to Japanese Patent Application No. 2008-245771 filed on Sep. 25, 2008 and Japanese Patent Application No. 2009-050910 filed on Mar. 4, 2009, which are expressly incorporated herein by reference in their entirety.

TECHNICAL FIELD

The present invention relates to an optical information recording medium permitting the recording and reproducing of information with a laser beam, and more particularly, to a heat mode optical information recording medium suited to the recording and reproducing of information with a short-wavelength laser beam with a wavelength of equal to or shorter than 440 nm and to a method of recording information on the optical information recording medium by irradiation of a short-wavelength laser beam with a wavelength of equal to or shorter than 440 nm.

The present invention further relates to a novel azo metal complex dye suitable for use as a dye in the recording layer of an optical information recording medium.

BACKGROUND TECHNIQUE

The recordable CD (CD-R) and recordable DVD (DVD-R) have been known as optical information recording media permitting the write-once recording of information with a laser beam. In contrast to the recording of information on a CD-R, which is conducted with a laser beam in the infrared range (normally, at a wavelength of about 780 nm), the recording of information on a DVD-R is conducted with a visible light laser beam (with a wavelength of about 630 to 680 nm). Since a recording laser beam of shorter wavelength is employed for a DVD-R than for a CD-R, the DVD-R has an advantage of being able to record at higher density than on a CD-R. Thus, the status of the DVD-R as a high-capacity recording medium has to some degree been ensured in recent years.

Networks, such as the Internet, and high-definition television have recently achieved widespread popularity. With high-definition television (HDTV) broadcasts near at hand, demand is growing for high-capacity recording media for recording image information both economically and conveniently. However, the CD-R and DVD-R do not afford recording capacities that are adequate to handle future needs. Accordingly, to increase the recording density by using a laser beam of even shorter wavelength than that employed in a DVD-R, the development of high-capacity disks capable of recording with laser beams of short wavelength is progressing. For example, an optical recording disk known as the Blu-ray type (Blu-ray Disc, also referred to as "BD", hereinafter) employing a blue laser of 405 nm, and HD-DVD have been proposed as such optical disks.

For example, Reference 1 (Japanese Unexamined Patent Publication (KOKAI) Heisei No. 11-310728), Reference 2 (Japanese Unexamined Patent Publication (KOKAI) Heisei No. 11-130970), Reference 3 (Japanese Unexamined Patent Publication (KOKAI) No. 2002-274040), and Reference 4 (Japanese Unexamined Patent Publication (KOKAI) No. 2000-168237) propose the use of azo metal complex dyes as dyes contained in the recording layer in DVD-R optical disks. The contents of the above applications are expressly incorporated herein by reference in their entirety. These azo metal complex dyes have absorption waveforms corresponding to red lasers, and cannot achieve adequate recording characteristics in recording by laser beams of short wavelength (for example, 405 nm).

Accordingly, in optical recording disks employing short-wavelength laser beams (such as a 405 nm blue laser beam), attempts are being made to shorten the absorption wavelength of the azo metal complexes employed in DVD-Rs. These attempts are disclosed in, for example, Reference 5 (Japanese Unexamined Patent Publication (KOKAI) No. 2001-158862), Reference 6 (Japanese Unexamined Patent Publication (KOKAI) No. 2006-142789), Reference 7 (Japanese Unexamined Patent Publication (KOKAI) No. 2006-306070) and English language family member US2009/0053455A1, which are expressly incorporated herein by reference in their entirety.

The present inventors evaluated the light resistance of the dye films and the recording and reproduction characteristics of optical information recording media corresponding to short wavelength lasers, such as blue lasers, for the azo metal complexes described in References 5 to 7. As a result, the present inventors found that none of these azo metal complexes achieved both light resistance and recording and reproduction characteristics (jitter and reproduction durability).

DISCLOSURE OF THE INVENTION

Accordingly, it is an object of the present invention to provide an optical information recording medium, affording good recording and reproduction characteristics and good light resistance in recording and reproduction by irradiation of a short-wavelength laser beam (particularly in information recording by irradiation of a laser beam having a wavelength of equal to or shorter than 440 nm), and a novel compound, suitable for use as a dye in the recording layer of the above optical information recording medium.

The present inventors conducted extensive research into the light resistance of dyes and the recording and reproduction characteristics of optical information recording media corresponding to blue lasers, resulting in the following discoveries.

The azo metal complex dyes specifically disclosed in References 5 to 7 are all azo metal complex dyes in which two molecules of azo dyes are coordinated to one metal ion. However, these metal complexes are incapable of affording adequate light resistance and recording and reproduction characteristics in recording and reproduction by irradiation of the above-described short-wavelength laser beam.

Accordingly, the present inventors conducted further research, resulting in the discovery that, among azo metal complex dyes, those azo metal complex dyes comprising transition metal ions afforded good recording and reproduction characteristics in the short-wavelength region. However, even among azo metal complex dyes containing transition metal ions, no dye affording both good light resistance and recording and reproduction characteristics was discovered among the azo metal complex dyes described in References 5 to 7. Nor was any dye affording good reproduction durability discovered among the above-described azo metal complex dyes.

On the basis of these discoveries, the present inventors thought that the above azo metal complex dyes might be unable to afford either light resistance or reproduction durability due to an inability to efficiently deactivate the excited state of the azo molecules as ligands. Accordingly, we conceived that by making the number of transition metal ions in an azo metal complex dye greater than the number of azo dye molecules, and by increasing the number of transition metal ions forming coordination bonds with a single molecule of azo dye, it would be possible to promote the displacement of energy from the azo ligands to the metal ions. On this basis, we discovered that an optical information recording medium affording good light resistance, good reproduction durability for irradiation of a short-wavelength laser, and good recording and reproduction characteristics could be achieved.

It was also discovered that extremely good recording and reproduction characteristics were achieved by employing specific azo metal complex dyes with seven transition metal ions per six azo ligands in the recording layers of optical information recording media corresponding to short wavelength lasers, such as Blu-ray discs, and that these dyes afforded good light resistance, solubility, solution stability, and high-temperature and elevated humidity storage properties in powders and dye films.

The present invention was devised based on these discoveries.

An aspect of the present invention relates to an optical information recording medium comprising a recording layer on a surface of a support, wherein the surface of the support has pregrooves with a track pitch ranging from 50 to 500 nm, the recording layer comprises an azo metal complex dye, and the azo metal complex dye is a complex of six azo dyes and seven transition metal ions, wherein the multiple transition metal ions contained in a single molecule of the azo metal complex dye may be mutually identical or different, and the multiple azo dyes contained in a single molecule of the azo metal complex dye may be mutually identical or different.

The above azo dye may be an azo dye comprising a partial structure denoted by general formula (A) below.

[Chem. 1]

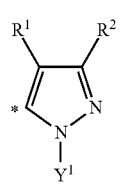

General formula (A)

In general formula (A), $R^1$ and $R^2$ each independently denote a hydrogen atom or a substituent, $Y^1$ denotes a hydrogen atom that may dissociate during formation of the azo metal complex dye, and * denotes a binding position with —N=N— group.

The azo dye may be an azo dye denoted by general formula (1) below.

[Chem. 2]

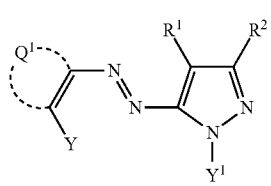

General formula (1)

In general formula (1), $Q^1$ denotes an atom group forming a heterocyclic ring or a carbon ring with two adjacent carbon atoms, Y denotes a group comprising a hydrogen atom that may dissociate during formation of the azo metal complex dye, and $R^1$, $R^2$, and $Y^1$ are defined respectively as in general formula (A).

The following partial structure:

[Chem. 3]

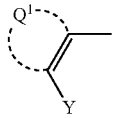

in general formula (1) may be a partial structure denoted by general formula (B) below.

[Chem. 4]

General formula (B)

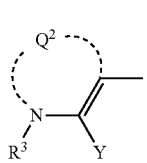

In general formula (B), Y is defined as in general formula (1), $Q^2$ denotes an atom group forming a nitrogen-containing hetero ring with an adjacent nitrogen atom, an adjacent carbon atom and a carbon atom bonded to the group denoted by Y, and $R^3$ denotes an aryl group or a heteroaryl group.

The azo dye may be an azo dye denoted by general formula (2) below.

[Chem. 5]

General formula (2)

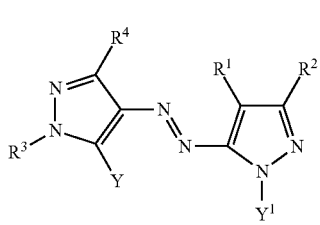

In general formula (2), $R^1$, $R^2$, $Y^1$ and Y are defined respectively as in general formula (1), $R^3$ is defined as in general formula (B), and $R^4$ denotes a hydrogen atom or a substituent.

The azo metal complex dye may be an azo metal complex dye denoted by general formula (C) below.

[Chem. 6]

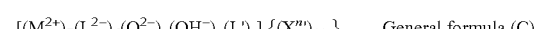

General formula (C)

In general formula (C), $M^{2+}$ denotes a divalent transition metal ion, $L^{2-}$ denotes a divalent anion that is the azo dye denoted by general formula (1) from which two hydrogen atoms have dissociated, each of p and q denotes an integer ranging from 0 to 2, with p+q=2, $X^{n+}$ denotes a cation of valence n, with n denoting an integer ranging from 1 to 10, L denotes a ligand, and r denotes an integer ranging from 0 to 5.

In general formula (C), $X^{n+}$ may denote an ammonium ion.

The transition metal ion may be a copper ion.

The azo metal complex dye may be an azo metal complex dye comprising $O^{2-}$ and/or $OH^-$.

The azo metal complex dye may be one obtained by reaction of the azo dyes with the transition metal ions in the presence of a base.

The recording layer may comprise a base, the base including protonated bases.

The recording layer may comprise a cationic dye having absorption at a wavelength of 405 nm.

The recording layer may comprise a complex salt of the azo metal complex dye and the cationic dye.

The cationic dye moiety contained in the cationic dye may be denoted any of general formulas (D) to (F) below.

[Chem. 7]

General formula (D)

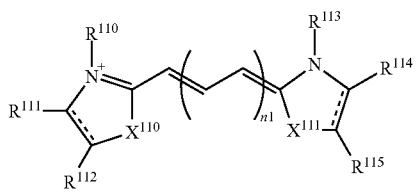

In general formula (D), each of $R^{110}$, $R^{111}$, $R^{112}$, $R^{113}$, $R^{114}$ and $R^{115}$ independently denotes a hydrogen atom or a substituent, $R^{111}$ and $R^{112}$ may bond together to form a ring structure, $R^{114}$ and $R^{115}$ may bond together to form a ring structure, each of $X^{110}$ and $X^{111}$ independently denotes a carbon atom, oxygen atom, nitrogen atom, or sulfur atom, and n1 denotes an integer of equal to or greater than 0:

[Chem. 8]

General formula (E)

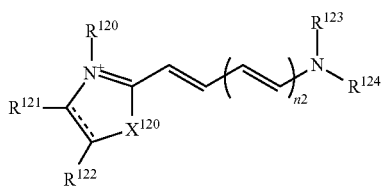

In general formula (E), each of $R^{120}$, $R^{121}$, and $R^{122}$ independently denotes a hydrogen atom or a substituent, $R^{121}$ and $R^{122}$ may bond together to form a ring structure, each of $R^{123}$ and $R^{124}$ independently denotes a substituent and may bond together to form a ring structure, $X^{120}$ independently denotes a carbon atom, oxygen atom, nitrogen atom, or sulfur atom, and n2 denotes an integer of equal to or greater than 0:

[Chem. 9]

General formula (F)

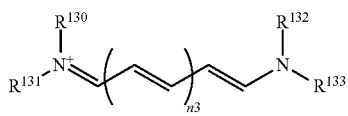

In general formula (F), each of $R^{130}$, $R^{131}$, $R^{132}$, and $R^{133}$ independently denotes a substituent, $R^{130}$ and $R^{131}$ may bond together to form a ring structure, $R^{132}$ and $R^{133}$ may bond together to form a ring structure, and n3 denotes an integer of equal to or greater than 0.

The cationic dye may have a maximum absorption wavelength at a wavelength range of 385 to 450 nm.

The recording layer may comprise a neutral dye that is a complex of an azo compound denoted by general formula (G) below and a metal ion or a metal oxide ion.

[Chem. 10]

General formula (G)

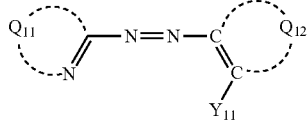

In general formula (G), $Q^{11}$ denotes an atom group forming a nitrogen-containing hetero ring, $Q^{12}$ denotes an atom group forming a hetero ring or a carbon ring, and $Y^{11}$ denotes a group containing a hydrogen atom that may dissociate during formation of the complex.

The above optical information recording medium may be employed for recording information by irradiation of a laser beam having a wavelength of equal to or shorter than 440 nm.

The above optical information recording medium may comprise a reflective layer between the support and the recording layer, and the laser beam may be irradiated onto the recording layer from a surface side opposite from the support.

A further aspect of the present invention relates to a method of recording information comprising:

recording information on the recording layer comprised in the above optical recording medium, and conducting the recording by irradiation of a laser beam having a wavelength of equal to or shorter than 440 nm onto the optical information recording medium.

A further aspect of the present invention relates to an azo metal complex dye, which is denoted by general formula (C) above.

The present invention can provide an optical information recording medium affording good recording and reproduction characteristics with a blue laser beam having a wavelength of equal to or shorter than 440 nm as well as having extremely good light resistance (in particular, an optical information recording medium permitting the recording of information by irradiation of a laser beam with a wavelength of equal to or shorter than 440 nm).

Since the azo metal complex dye can exhibit excellent light resistance, it is suitable for various uses. It is particularly suitable as an optical information recording material because of good film stability.

BRIEF DESCRIPTION OF THE DRAWINGS

FIG. 1 is a schematic sectional view showing an example of the optical information recording medium of the present invention.

EMBODIMENTS FOR CARRYING OUT THE INVENTION

The optical information recording medium, the method of recording information and the azo metal complex dye of the present invention will be described in detail below.

Optical Information Recording Medium

The optical information recording medium of the present invention comprises a recording layer, directly or through an layer such as a reflective layer, on a surface of a support, the surface having pregrooves with a track pitch ranging from 50 to 500 nm. The optical information recording medium of the present invention is suitable as a high-density recording optical disk for recording information with short-wavelength lasers, such as a BD or HD-DVD.

The above-described high-density recording optical disk is structurally characterized by a narrower track pitch than conventional recordable optical disks. Further, optical disks of the BD configuration have a layer structure, differing from that of conventional recordable optical disks, in the form of a reflective layer and a recording layer sequentially provided on a support, and a relatively thin protective layer (commonly referred to as a "cover layer") present on the recording layer. In such optical information recording media for recording with short-wavelength laser, there has been a problem in that adequate recording and reproduction characteristics cannot not be achieved with the dyes employed as recording dyes in conventional recordable optical information recording media such as CD-Rs and DVD-Rs.

By contrast, in the present invention, an azo metal complex dye comprising six azo dyes and seven transition metal ions is incorporated into the recording layer of an optical information recording medium of narrower track pitch than in conventional write-once optical information recording media, thereby yielding good recording and reproduction characteristics. The optical information recording medium of the present invention can yield good recording and reproduction characteristics for irradiation with short wavelength (for example, wavelengths of equal to or shorter than 440 nm) laser beams, as well as extremely good light resistance and good stability in heat and humidity. In particular, the optical information recording medium of the present invention is suitable as a BD-structure medium in which a reflective layer is present between the support and the recording layer, such that the laser beam that is used in recording and reproduction irradiates the recording layer from the surface on the opposite side from the surface facing the reflective layer.

Further, the azo metal complex dye of the present invention that is denoted by general formula (C) was found to exhibit extremely good light resistance, good solubility, and good stability in heat and humidity. Accordingly, the present invention can provide an optical information recording medium with good recording characteristics for irradiation with a short wavelength laser beam, a high degree of light resistance, good solubility, and good stability in heat and humidity.

The azo dye in the present invention denotes a dye compound that comprises an acyclic azo group (—N=N—) and is capable of forming a complex with a metal ion, including cases where it becomes a ligand in a metal complex. For example, when two azo ligands are coordinated with one metal ion in each molecule, the number of azo dyes per molecule is two. The case where an azo dye forms a complex with a metal ion is referred to as an azo metal complex dye. In the present invention, the term "azo ligand" refers to the case where the azo dye becomes a ligand. The azo ligand becomes an anionic ligand by losing dissociating hydrogen atoms, desirably becoming a divalent anionic ligand by losing two dissociating hydrogen atoms.

The transition metal ion in the present invention denotes the ion of a transition metal atom. The term "transition metal ion" is a collective term for the elements of groups IIIa to VIII and group Ib in the periodic table of the elements. The transition metal atom is not specifically limited. Mn, Fe, Co, Ni, and Cu are desirable; Co, Ni, and Cu are preferred; and Cu is of greater preference.

A divalent transition metal ion is desirable as the transition metal ion. Examples of divalent transition metal ions are: $Mn^{2+}$, $Fe^{2+}$, $Co^{2+}$, $Ni^{2+}$, $Cu^{2+}$, $Ru^{2+}$, $Pd^{2+}$, and $Pt^{2+}$. $Mn^{2+}$, $Fe^{2+}$, $Co^{2-}$, $Ni^{2+}$, and $Cu^{2+}$ are desirable; $Co^{2+}$, $Ni^{2+}$, and $Cu^{2+}$ are preferred; and $Cu^{2+}$ is of greater preference.

The recording layer of the optical information recording medium of the present invention will be described below.

The recording layer of the optical information recording medium of the present invention contains an azo metal complex dye in the form of a complex of six azo dyes (comprising six azo ligands) and seven transition metal ions. In this context, the multiple transition metal ions contained in a single molecule of the azo metal complex dye may be mutually identical or different, and the multiple azo dyes contained in a single molecule of the azo metal complex dye may be mutually identical or different. Employing a complex of six azo dyes and seven transition metal ions as the recording layer dye can enhance the light resistance of the recording layer. It can also improve optical stability before and after recording, as well as stability in heat and humidity and reproduction durability. It suffices for the azo metal complex dye to be a complex comprising constituent components in the form of six azo dyes and seven transition metal ions, but it can further comprise components such as ligands and ions necessary to neutralize the charge of the molecule and crosslinking ligands.

The type of the constituent components of the azo metal complex dye, the number of these components per molecule, the state of coordination, and the like can be analyzed by a known analysis method such as ESI-MS, MALDI-MS, ESI-TOF-MS, MALDI-TOF-MS, X-ray structural analysis, ICP, elemental analysis, HPLC, and GC. For example, the fact that the azo metal complex dye is a complex incorporating six azo dyes (divalent anions) and seven transition metal ions per molecule can be confirmed by at least one form of analysis selected from the group consisting of ESI-TOF-MS, MALDI-TOF-MS, and X-ray structural analysis.

A least a portion of the azo dyes contained in the azo metal complex dye is desirably comprised of divalent azo dye anions. This is because, since efficient deactivation of the excited state of the azo ligands relates to enhancing light resistance, an increase in the a-donor property and increased rupturing of the ligand field of the metal ions are thought to be desirable to enhance efficient energy displacement (see Kodansha Scientific, Complex Chemistry, New Edition, comp. by The Society of Pure & Applied Coordination Chemistry, pp. 30 to 42, which is expressly incorporated herein by reference in its entirety).

The azo metal complex dye desirably comprises seven transition metal ions per molecule, with three transition metal ions being coordinate bonded to each azo dye. Examples of azo dyes that are capable of forming such azo metal complex dyes are the azo dyes having the partial structure denoted by general formula (A) below. An example of a desirable embodiment is the azo dye denoted by general formula (1). And an example of a preferred embodiment is the azo dye denoted by general formula (2) below. Examples of the azo metal complex dye that is formed are azo metal complex dyes exhibiting a coordination structure identical to that of the azo metal complex dye denoted by general formula (C). The azo metal complex dye denoted by general formula (C) is an example of a particularly desirable embodiment. In the azo metal complex dye containing multiple azo dyes and multiple transition metal ions per molecule as set forth above, the multiple azo dyes may be mutually identical or different and the multiple transition metal ions may be mutually identical or different. The multiple azo dyes are desirably mutually identical, and the multiple transition metal ions are desirably mutually identical.

The azo dye forming the azo metal complex dye will be described in detail below.

An azo dye having the partial structure denoted by general formula (A) below that is capable of forming a divalent azo dye anion or an azo dye having the triazole structure denoted by general formula (A)' below, in which the carbon atom bonded to $R^1$ in general formula (A) below is a nitrogen atom is desirable, and an azo dye having the partial structure denoted by general formula (A) below is preferred as the above azo dye.

[Chem. 11]

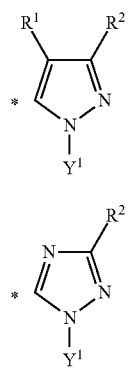

General formula (A)

General formula (A)'

[In general formula (A) and (A)', $R^1$ and $R^2$ each independently denote a hydrogen atom or a substituent, $Y^1$ denotes a hydrogen atom that may dissociate during formation of the azo metal complex dye, and * denotes a binding position with —N=N— group.]

General formula (A) will be described in greater detail below. Details regarding $R^2$ and $Y^1$ contained in general formula (A)' are as described below for general formula (A).

In general formula (A), $Y^1$ denotes a hydrogen atom that may dissociate during formation of the azo metal complex dye (also referred to as a "dissociating hydrogen atom", hereinafter). In the partial structure denoted by general formula (A), the hydrogen atom $Y^1$ on the pyrazole ring can be dissociated, permitting the formation of a complex with a transition metal ion through the other nitrogen atom on the pyrazole ring in partial structure (A) and achieving a high film stability and good recording characteristics even when the number of transition metal ions is larger than the number of azo dyes.

In general formula (A), $R^1$ and $R^2$ each independently denote a hydrogen atom or a substituent. From the perspective of enhancing solubility, $R^1$ and $R^2$ are preferably substituents. The substituents are not specifically limited; examples are: halogen atoms, alkyl groups (including cycloalkyl groups and bicycloalkyl groups), alkenyl groups (including cycloalkenyl groups and bicycloalkenyl groups), alkynyl groups, aryl groups, heterocyclic groups, cyano groups, hydroxyl groups, nitro groups, carboxyl groups, alkoxy groups, aryloxy groups, silyloxy groups, heterocyclic oxy groups, acyloxy groups, carbamoyloxy groups, alkoxycarbonyloxy groups, aryloxycarbonyloxy groups, amino groups (including anilino groups), acylamino groups, aminocarbonylamino groups, alkoxycarbonylamino groups, aryloxycarbonylamino groups, sulfamoylamino groups, alkyl and arylsulfonylamino groups, mercapto groups, alkylthio groups, arylthio groups, heterocyclic thio groups, sulfamoyl groups, sulfo groups, alkyl and arylsulfinyl groups, alkyl and arylsulfonyl groups, acyl groups, aryloxycarbonyl groups, alkoxycarbonyl groups, carbamoyl groups, aryl and heterocyclic azo groups, imido groups, phosphino groups phosphinyl groups, phosphinyloxy groups, phosphinylamino groups, and silyl groups.

More specifically, Examples of $R^1$ and $R^2$ include: halogen atoms (such as chlorine atoms, bromine atoms, and iodine atoms), alkyl groups [linear, branched, or cyclic substituted or unsubstituted alkyl groups in the form of alkyl groups (preferably alkyl groups having 1 to 30 carbon atoms such as methyl groups, ethyl groups, n-propyl groups, isopropyl groups, t-butyl groups, n-octyl groups, eicosyl groups, 2-chloroethyl groups, 2-cyanoethyl groups, and 2-ethylhexyl groups), cycloalkyl groups (preferably substituted or unsubstituted cycloalkyl groups having 3 to 30 carbon atoms such as cyclohexyl groups, cyclopentyl groups, and 4-n-dodecylcyclohexyl groups), bicycloalkyl groups (preferably substituted or unsubstituted bicycloalkyl groups having 5 to 30 carbon atoms, that is, monovalent groups obtained by removing a single hydrogen atom from a bicycloalkane having 5 to 30 carbon atoms, such as bicyclo[1,2,2]heptane-2-yl and bicyclo[2,2,2]octane-3-yl), and tricyclo structures having an additional ring; the alkyl groups in the description of substituents given below (such as the alkyl group in an alkylthio group) denote this same concept of an alkyl group]; alkenyl groups [linear, branched, or cyclic substituted or unsubstituted alkenyl groups including alkenyl groups (preferably substituted or unsubstituted alkenyl groups having 2 to 30 carbon atoms, such as vinyl groups, allyl groups, prenyl groups, geranyl groups, and oleyl groups), cycloalkenyl groups (preferably substituted or unsubstituted cycloalkenyl groups having 3 to 30 carbon atoms, that is, monovalent groups obtained by removing a single hydrogen atom from a cycloalkene having 3 to 30 carbon atoms, such as 2-cyclopentene-1-yl and 2-cyclohexene-1-yl), bicycloalkenyl groups (substituted or unsubstituted bicycloalkenyl groups, preferably substituted or unsubstituted bicycloalkenyl groups having 5 to 30 carbon atoms, that is, monovalent groups obtained by removing a hydrogen atom from a bicycloalkene having a single double bond, such as bicyclo[2,2,1]hepto-2-ene-1-yl and bicyclo[2,2,2]-octo-2-ene-4-yl)]; alkynyl groups (preferably substituted or unsubstituted alkynyl groups having 2 to 30 carbon atoms such as ethynyl groups, propargyl groups, trimethylsilylethynyl groups, and aryl groups (preferably substituted or unsubstituted aryl groups having 6 to 30 carbon atoms, such as phenyl groups, p-tolyl groups, naphthyl groups, m-chlorophenyl groups, and o-hexadecanoylaminophenyl groups); heterocyclic groups (preferably monovalent groups obtained by removing a single hydrogen atom from a substituted or unsubstituted five or six-membered aromatic or nonaromatic heterocyclic compound; more preferably five or six-membered aromatic heterocyclic groups having 3 to 30 carbon atoms, such as 2-furyl groups, 2-thienyl groups, 2-pyrimidinyl groups, and 2-benzothiazolyl groups); cyano groups; hydroxyl groups; nitro groups; carboxyl groups; alkoxy groups (preferably substituted or unsubstituted alkoxy groups having 1 to 30 carbon atoms, such as methoxy groups, ethoxy groups, isopropoxy groups, t-butoxy groups, n-octyloxy groups, and 2-methoxyethoxy groups); aryloxy groups (preferably substituted or unsubstituted aryloxy groups having 6 to 30 carbon atoms, such as phenoxy groups, 2-methylphenoxy groups, 4-t-butylphenoxy groups, 3-nitrophenoxy groups, and 2-tetradecanoylaminophenoxy groups); silyloxy groups (preferably silyloxy groups having 3 to 20 carbon atoms, such as trimethylsilyloxy groups and t-butyldimethylsilyloxy groups); heterocyclic oxy groups (preferably substituted or unsubstituted heterocyclic oxy groups having 2 to 30 carbon atoms, 1-phenyltetrazole-5-oxy groups, and 2-tetrahydropyranyloxy groups); acyloxy groups (preferably formyloxy groups, substituted or unsubstituted alkylcarbonyloxy groups having 2 to 30 carbon atoms, substituted or unsubstituted arylcarbonyloxy groups having 6 to 30 carbon atoms, such as formyloxy groups, acetyloxy groups, pivaloyloxy groups, stearoyloxy groups, benzoyloxy groups, and p-methoxyphenylcarbonyloxy groups); carbamoyloxy groups (preferably substituted or unsubstituted carbamoyloxy groups having 1 to 30 carbon atoms, such as N,N-dimethylcarbamoyloxy groups, N,N-diethylcarbamoyloxy groups, morpholinocarbonyloxy groups, N,N-di-n-octylaminocarbonyloxy groups, and N-n-octylcarbamoyloxy groups); alkoxycarbonyloxy groups (preferably substituted or unsubstituted alkoxycarbonyloxy groups having 2 to 30 carbon atoms, such as methoxycarbonyloxy groups, ethoxycarbonyloxy groups, t-butoxycarbonyloxy groups, and n-octylcarbonyloxy groups); aryloxycarbonyloxy groups (preferably substituted or unsubstituted aryloxycarbonyloxy groups having 7 to 30 carbon atoms, such as phenoxycarbonyloxy groups, p-methoxyphenoxycarbonyloxy groups, and p-n-hexadecyloxyphenoxycarbonyloxy groups); amino groups (preferably amino groups, substituted or unsubstituted alkylamino groups having 1 to 30 carbon atoms and substituted or unsubstituted anilino groups having 6 to 30 carbon atoms such as amino groups, methylamino groups, dimethylamino groups, anilino groups, N-methylanilino groups, and diphenylamino groups); acylamino groups (preferably formylamino groups, substituted or unsubstituted alkylcarbonylamino groups having 1 to 30 carbon atoms, and substituted or unsubstituted arylcarbonylamino groups having 6 to 30 carbon atoms, such as formylamino groups, acetylamino groups, pivaloylamino groups, lauroylamino groups, benzoylamino groups, and 3,4,5-tri-n-octyloxyphenylcarbonylamino groups); aminocarbonylamino groups (preferably substituted or unsubstituted aminocarbonylamino groups having 1 to 30 carbon atoms, such as carbamoylamino groups, N,N-dimethylaminocarbonylamino groups, N,N-diethylaminocarbonylamino groups, and morpholinocarbonylamino groups); alkoxycarbonylamino groups (preferably substituted or unsubstituted alkoxycarbonylamino groups having 2 to 30 carbon atoms, such as methoxycarbonylamino groups, ethoxycarbonylamino groups, t-butoxycarbonylamino groups, n-octadecyloxycarbonylamino groups, and N-methylmethoxycarbonylamino groups); aryloxycarbonylamino groups (preferably substituted or unsubstituted aryloxycarbonylamino groups having 7 to 30 carbon atoms, such as phenoxycarbonylamino groups, p-chlorophenoxycarbonylamino groups, and m-n-octyloxyphenoxycarbonylamino groups); sulfamoylamino groups (preferably substituted or unsubstituted sulfamoylamino groups having 0 to 30 carbon atoms, such as sulfamoylamino groups, N,N-dimethylaminosulfonylamino groups, and N-n-octylaminosulfonylamino groups); alkyl and arylsulfonylamino groups (preferably substituted or unsubstituted alkylsulfonylamino groups having 1 to 30 carbon atoms and substituted or unsubstituted arylsulfonylamino groups having 6 to 30 carbon atoms, such as methylsulfonylamino groups, butylsulfonylamino groups, phenylsulfonylamino groups, 2,3,5-trichlorophenylsulfonylamino groups, and p-methylphenylsulfonylamino groups); mercapto groups; alkylthio groups (preferably substituted or unsubstituted alkylthio groups having 1 to 30 carbon atoms, such as methylthio groups, ethylthio groups, and n-hexadecylthio groups); arylthio groups (preferably substituted or unsubstituted arylthio groups having 6 to 30 carbon atoms, such as phenylthio groups, p-chlorophenylthio groups, and m-methoxyphenylthio groups); heterocyclic thio groups (preferably substituted or unsubstituted heterocyclic thio groups having 2 to 30 carbon atoms, such as 2-benzothiazolylthio groups and 1-phenyltetrazole-5-ylthio groups); sulfamoyl groups (preferably substituted or unsubstituted sulfamoyl groups having 0 to 30 carbon atoms, such as N-ethylsulfamoyl groups, N-(3-dodecyloxypropyl)sulfamoyl groups, N,N-dimethylsulfamoyl groups, N-acetylsulfamoyl groups, N-benzoylsulfamoyl groups, N—(N'-phenylcarbamoyl)sulfamoyl groups); sulfo groups; alkyl and arylsulfinyl groups (preferably substituted or unsubstituted alkylsulfinyl groups having 1 to 30 carbon atoms and substituted or unsubstituted arylsulfinyl groups having 6 to 30 carbon atoms, such as methylsulfinyl groups, ethylsulfinyl groups, phenylsulfinyl groups, and p-methylphenylsulfinyl groups); alkyl and arylsulfonyl groups (preferably substituted or unsubstituted alkylsulfonyl groups having 1 to 30 carbon atoms and substituted or unsubstituted arylsulfonyl groups having 6 to 30 carbon atoms, such as methylsulfonyl groups, ethylsulfonyl groups, phenylsulfonyl groups, and p-methylphenylsulfonyl groups); acyl groups (preferably formyl groups, substituted or unsubstituted alkylcarbonyl groups having 2 to 30 carbon atoms, substituted or unsubstituted arylcarbonyl groups having 7 to 30 carbon atoms, and substituted or unsubstituted heterocyclic carbonyl groups having 4 to 30 carbon atoms and bound to carbonyl groups through carbon atoms, such as acetyl groups, pivaloyl groups, 2-chloroacetyl groups, stearoyl groups, benzoyl groups, p-n-octyloxyphenylcarbonyl groups, 2-pyridylcarbonyl groups, and 2-furylcarbonyl groups); aryloxycarbonyl groups (preferably substituted or unsubstituted aryloxycarbonyl groups having 7 to 30 carbon atoms, such as phenoxycarbonyl groups, o-chlorophenoxycarbonyl groups, m-nitrophenoxycarbonyl groups, and p-t-butylphenoxycarbonyl groups); alkoxycarbonyl groups (preferably substituted or unsubstituted alkoxycarbonyl groups having 2 to 30 carbon atoms, such as methoxycarbonyl groups, ethoxycarbonyl groups, t-butoxycarbonyl groups, and n-octadecyloxycarbonyl groups); carbamoyl groups (preferably substituted or unsubstituted carbamoyl groups having 1 to 30 carbon atoms, such as carbamoyl groups, N-methylcarbamoyl groups, N,N-dimethylcarbamoyl groups, N,N-di-n-octylcarbamoyl groups, and N-(methylsulfonyl)carbamoyl groups); aryl and heterocyclic azo groups (preferably substituted or unsubstituted arylazo groups having 6 to 30 carbon atoms and substituted or unsubstituted heterocyclic azo groups having 3 to 30 carbon atoms, such as phenylazo groups, p-chlorophenylazo groups, and 5-ethylthio-1,3,4-thiadiazole-2-ylazo groups); imido groups (preferably N-succinimide and N-phthalimide); phosphino groups (preferably substituted or unsubstituted phosphino groups having 2 to 30 carbon atoms, such as dimethylphosphino groups, diphenylphosphino groups, and methylphenoxyphosphino groups); phosphinyl groups (preferably substituted or unsubstituted phosphinyl groups having 2 to 30 carbon atoms, such as phosphinyl groups, dioctyloxyphosphinyl groups, and diethoxyphosphinyl groups); phosphinyloxy groups (preferably substituted or unsubstituted phosphinyloxy groups having 2 to 30 carbon atoms, such as diphenoxyphosphinyloxy groups, and dioctyloxyphosphinyloxy groups); phosphinylamino groups (preferably substituted or unsubstituted phosphinylamino groups having 2 to 30 carbon atoms, such as dimethoxyphosphinylamino groups and dimethylaminophosphinylamino groups); and silyl groups (preferably substituted or unsubstituted silyl groups having 3 to 30 carbon atoms, such as trimethylsilyl groups, t-butyldimethylsilyl groups, and phenyldimethylsilyl groups).

In those of the above functional groups that have a hydrogen atom, the hydrogen atom may be replaced with a substituent in the form of one of the above groups. Examples of such functional groups are alkylcarbonylaminosulfonyl groups, arylcarbonylaminosulfonyl groups, alkylsulfonylaminocarbonyl groups, and arylsulfonylaminocarbonyl groups. Examples thereof are methylsulfonylaminocarbonyl groups, p-methylphenylsulfonylaminocarbonyl groups, acetylaminosulfonyl groups, and benzoylaminosulfonyl groups. $R^1$ and $R^2$ may bond together to form a ring.

From the perspectives of readily obtaining azo metal complexes of extremely good light resistance and solubility, $R^1$ preferably denotes an electron-withdrawing group. Examples of electron-withdrawing groups that are preferably selected as $R^1$ are: substituted or unsubstituted alkyloxycarbonyl groups having 2 to 10 carbon atoms, substituted or unsubstituted aryloxycarbonyl groups having 7 to 10 carbon atoms, substituted or unsubstituted alkylaminocarbonyl groups having 2 to 10 carbon atoms, substituted or unsubstituted arylaminocarbonyl groups having 7 to 10 carbon atoms, substituted or unsubstituted alkylsulfonyl groups having 1 to 10 carbon atoms, substituted or unsubstituted arylsulfonyl groups having 6 to 10 carbon atoms, and cyano groups. Examples of such groups that are more preferably selected are: substituted or unsubstituted alkyloxycarbonyl groups having 2 to 10 carbon atoms, substituted or unsubstituted alkylsulfonyl groups having 1 to 10 carbon atoms, and cyano groups. The selection of a substituted or unsubstituted alkyloxycarbonyl group having 2 to 10 carbon atoms or a cyano group is of greater preference. And a cyano group is of still greater preference.

$R^2$ preferably denotes a hydrogen atom, substituted or unsubstituted alkyl group having 1 to 10 carbon atoms, or substituted or unsubstituted aryl group having 6 to 10 carbon atoms. From the perspective of recording characteristics, a hydrogen atom or substituted or unsubstituted alkyl group having 1 to 10 carbon atoms is preferred. From the perspective of solubility, substituted or unsubstituted alkyl group having 3 to 10 carbon atoms is further preferred. In addition, secondary or tertiary alkyl groups having 3 to 10 carbon atoms is preferred, with tertiary alkyl groups having 4 to 10 carbon atoms being of even greater preference.

The azo dye denoted by general formula (1) below is preferable as the azo dye comprising the partial structure denoted by general formula (A) above.

[Chem. 12]

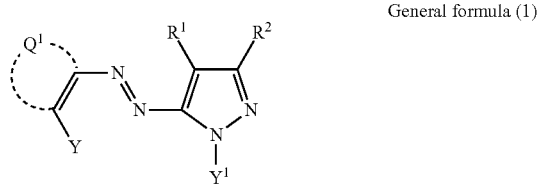

General formula (1)

The azo dye denoted by general formula (1) is only described for the azo form in azo-hydrazone tautomeric equilibrium, but may also be in the corresponding hydrazone form. In that case, the hydrazone form is to be considered as the same component as the azo form in the present invention. The same is true of general formula (2).

The pyrazole ring described in general formula (1) may also be a tautomeric or resonating structure. That case is also covered by general formula (1).

In general formula (1), each of $R^1$, $R^2$, and $Y^1$ is defined as in general formula (A), and the details thereof are as set forth above.

In general formula (1), $Q^1$ denotes an atom group forming a heterocyclic ring or a carbon ring with two adjacent carbon atoms. $Q^1$ is not specifically limited, but desirably forms a ring contained in the partial structure denoted by general formula (B) further below.

Y denotes a group comprising a hydrogen atom (a dissociating hydrogen atom) that may dissociate during formation of the azo metal complex dye. This hydrogen atom is one that is readily deprotonated and is capable of dissociating in the course of forming a complex with a transition metal ion. The azo dye that is denoted by general formula (1) can become an anionic ligand through the dissociation of the dissociating hydrogen atom, and become a divalent anionic ligand through the dissociation of two dissociating hydrogen atoms.

Examples of the group denoted by Y are: hydroxyl groups, amino groups (preferably substituted or unsubstituted alkylamino groups having 1 to 30 carbon atoms and substituted or unsubstituted anilino groups having 6 to 30 carbon atoms, such as amino groups, methylamino groups, dimethylamino groups, anilino groups, N-methylanilino groups, and diphenylamino groups), acylamino groups (preferably formylamino groups, substituted or unsubstituted alkylcarbonylamino groups having 1 to 30 carbon atoms, and substituted or unsubstituted arylcarbonylamino groups having 6 to 30 carbon atoms, such as formylamino groups, acetylamino group, pivaloylamino groups, lauroylamino groups, benzoylamino groups, and 3,4,5-tri-n-octyloxyphenylcarbonylamino groups), aminocarbonylamino groups (preferably substituted or unsubstituted aminocarbonylamino groups having 1 to 30 carbon atoms such as carbamoylamino groups, N,N-dimethylaminocarbonylamino groups, N,N-diethylaminocarbonylamino groups, and morpholinocarbonylamino groups), alkoxycarbonylamino groups (preferably substituted or unsubstituted alkoxycarbonylamino groups having 2 to 30 carbon atoms, such as methoxycarbonylamino groups, ethoxycarbonamino groups, t-butoxycarbonylamino groups, n-octadecyloxycarbonylamino groups, and N-methylmethoxycarbonylamino groups), aryloxycarbonylamino groups (preferably substituted or unsubstituted aryloxycarbonylamino groups having 7 to 30 carbon atoms, such as phenoxycarbonylamino groups, p-chlorophenoxycarbonylamino groups, and m-n-octyloxyphenoxycarbonylamino groups), sulfamoylamino groups (preferably substituted or unsubstituted sulfamoylamino groups having 0 to 30 carbon atoms, such as sulfamoylamino groups, N,N-dimethylaminosulfonylamino groups, and N-n-octylaminosulfonylamino groups), and alkyl and arylsulfonylamino groups (preferably substituted or unsubstituted alkylsulfonylamino groups having 1 to 30 carbon atoms and substituted or unsubstituted arylsulfonyl amino groups having 6 to 30 carbon atoms, such as methylsulfonylamino groups, butylsulfonylamino groups, phenylsulfonylamino groups, 2,3,5-trichlorophenylsulfonylamino groups, and p-methylphenylsulfonylamino groups).

When Y denotes an amino group comprising a substituent, the substituent may bond with the atom group denoted by $Q^1$ to form a ring.

Y preferably denotes a hydroxyl group, substituted or unsubstituted sulfamoylamino group having 0 to 4 carbon atoms, substituted or unsubstituted alkylsulfonylamino group having 1 to 4 carbon atoms, or substituted or unsubstituted arylsulfonylamino group having 3 to 10 carbon atoms; more preferably denotes a hydroxyl group, substituted or unsubstituted sulfamoylamino group having 0 to 4 carbon atoms, or substituted or unsubstituted alkylsulfonylamino group having 1 to 4 carbon atoms; and still more preferably denotes a hydroxyl group.

The following partial structure in general formula (1):

[Chem. 13]

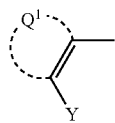

is desirably the partial structure denoted by general formula (B) below.

[Chem. 14]

General formula (B)

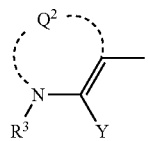

In general formula (B), Y is defined as in general formula (1), and details such as the desirable range are identical thereto.

$R^3$ denotes an aryl group or a heteroaryl group. $R^3$ desirably denotes a substituted or unsubstituted aryl group having 6 to 10 carbon atoms or a substituted or unsubstituted heteroaryl group having 1 to 10 carbon atoms, and preferably denotes a substituted or unsubstituted aryl group having 6 to 10 carbon atoms. These may also be condensed rings.

$Q^2$ denotes an atom group forming a nitrogen-containing hetero ring with the adjacent nitrogen atom, the adjacent carbon atom, and a carbon atom bonded to the group denoted by Y. The nitrogen-containing hetero ring formed by $Q^2$ is desirably a five-membered or six-membered ring, preferably a five-membered ring, and more preferably, a pyrazole ring.

The azo dye denoted by general formula (1) is desirably an azo dye denoted by general formula (2).

[Chem. 15]

General formula (2)

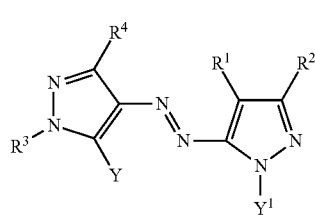

Details of general formula (2) will be described below.

In general formula (2), each of $R^1$, $R^2$, $Y^1$, and Y is defined as in general formula (1) and details regarding desirable ranges and the like are identical thereto.

$R^3$ is defined as in general formula (B) and details regarding desirable ranges and the like are identical thereto.

$R^4$ denotes a hydrogen atom or a substituent. The substituents given by way of example in the description of $R^1$ and $R^2$ are examples of the substituent. $R^4$ desirably denotes a substituent. Examples of desirable substituents denoted by $R^4$ are substituted or unsubstituted alkyl groups having 1 to 10 carbon atoms, substituted or unsubstituted aryl groups having 6 to 10 carbon atoms, substituted or unsubstituted alkoxy groups having 1 to 10 carbon atoms, substituted or unsubstituted aryloxy groups having 6 to 10 carbon atoms, substituted or unsubstituted alkylamino groups having 1 to 10 carbon atoms (including dialkylamino groups), and substituted or unsubstituted arylamino groups having 6 to 10 carbon atoms. Examples of preferred substituents are substituted or unsubstituted alkyl groups having 1 to 10 carbon atoms, substituted or unsubstituted alkoxy groups having 1 to 10 carbon atoms, and substituted or unsubstituted alkylamino groups having 1 to 10 carbon atoms. Examples of substituents of greater preference are substituted or unsubstituted alkyl groups having 1 to 10 carbon atoms and substituted or unsubstituted alkoxy groups having 1 to 10 carbon atoms.

In the azo dye denoted by general formula (2), $R^3$ desirably denotes a substituted or unsubstituted aryl group having 6 to 10 carbon atoms. $R^4$ desirably denotes a substituted or unsubstituted alkyl group having 1 to 10 carbon atoms, a substituted or unsubstituted alkoxy group having 1 to 10 carbon atoms, or a substituted or unsubstituted alkylamino group having 1 to 10 carbon atoms. $R^1$ desirably denotes a cyano group. And $R^2$ desirably denotes a tertiary alkyl group having 4 to 10 carbon atoms.

Specific examples of the azo dye denoted by general formula (1) will be given below. However, the present invention is not limited thereto.

[Chem. 16]

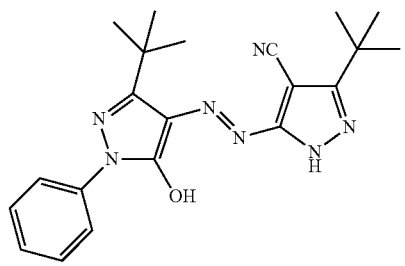
(L-1)

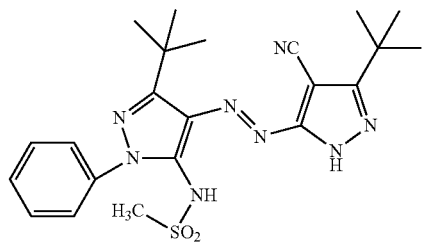
(L-2)

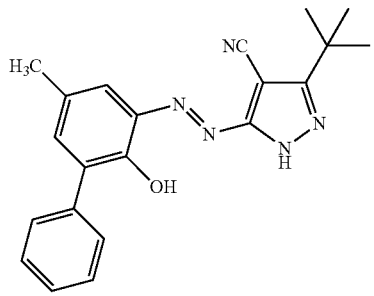
(L-3)

-continued
(L-4)
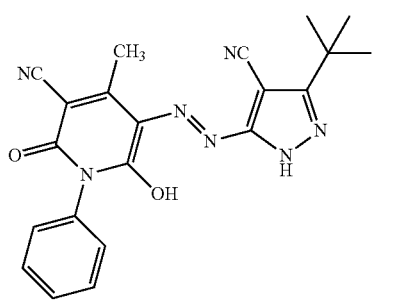
(L-5)
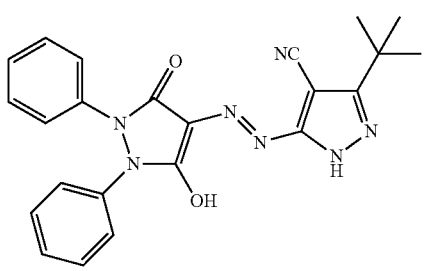
(L-6)
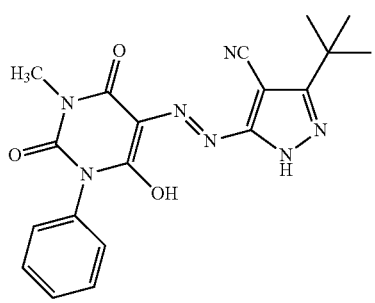
(L-7)
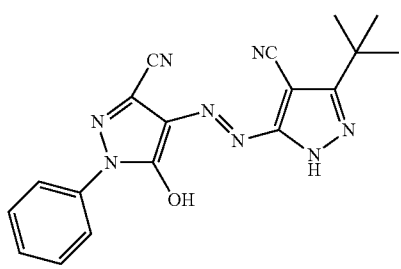
(L-8)
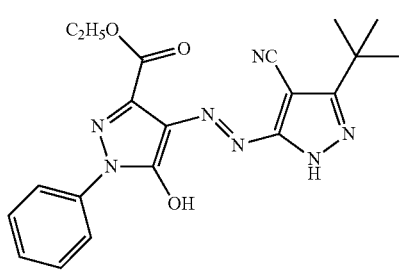
-continued
(L-9)
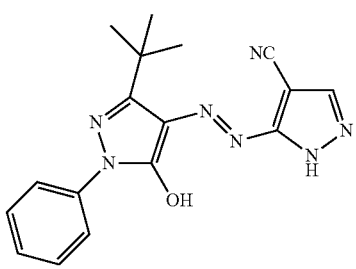
(L-10)
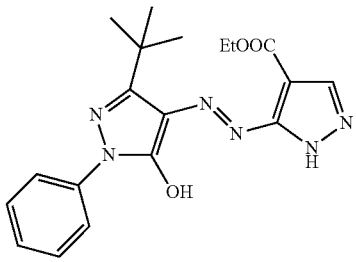
(L-11)
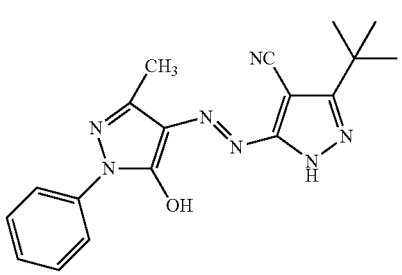
(L-12)
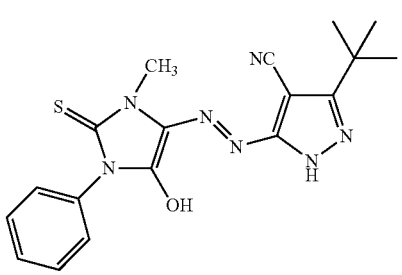
(L-13)
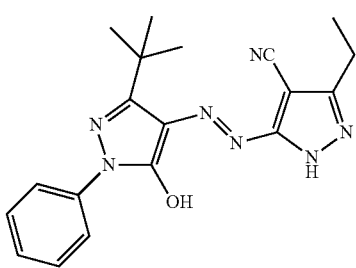
(L-14)

-continued
(L-15)
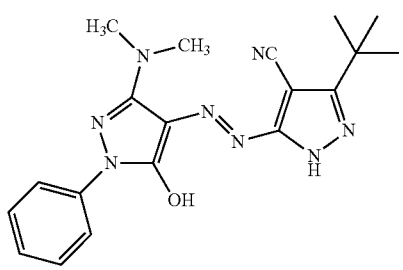
(L-16)
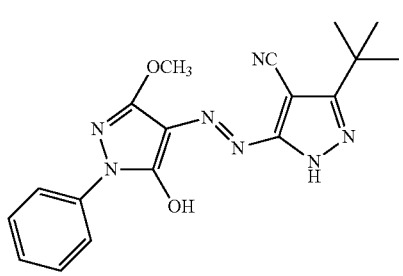
(L-17)
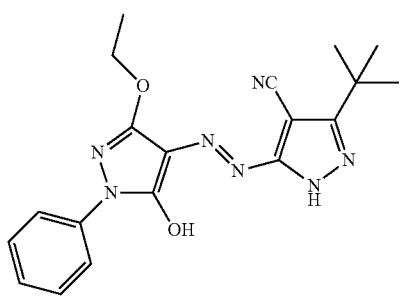
[Chem. 17]
(L-18)
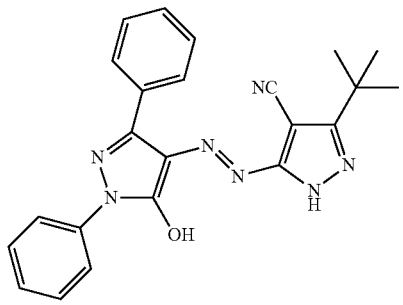
(L-19)
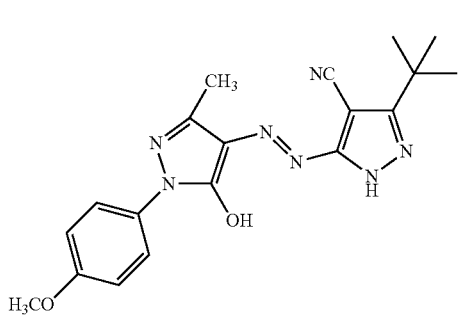
-continued
(L-20)
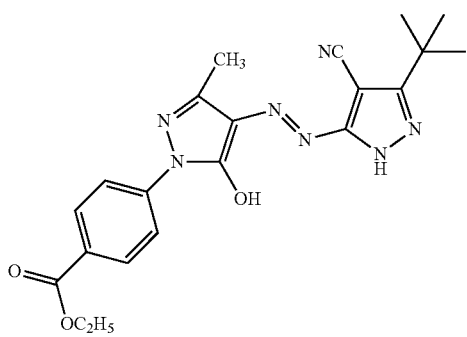
(L-21)
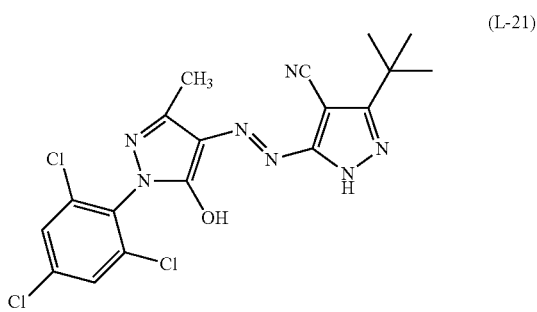
(L-22)
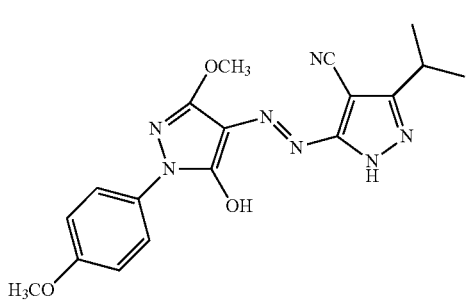
(L-23)
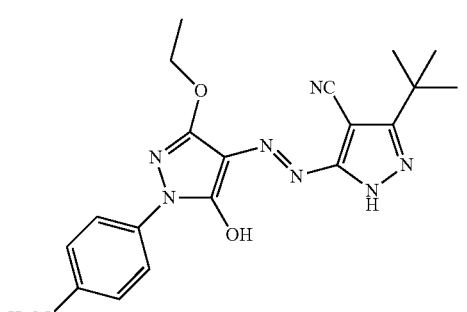
(L-24)
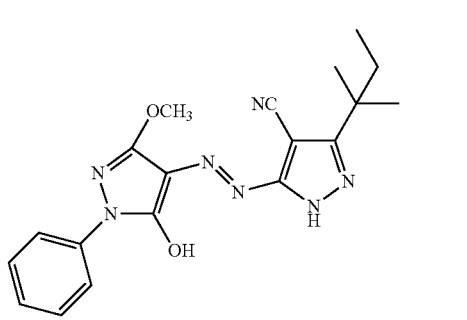

-continued

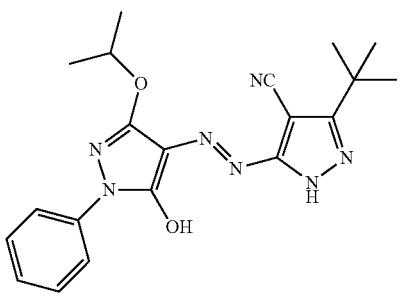
(L-25)

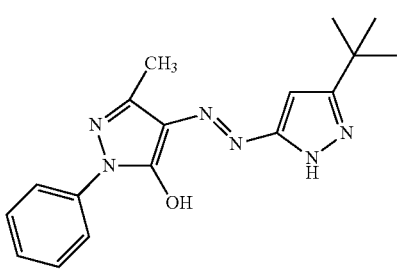
(L-26)

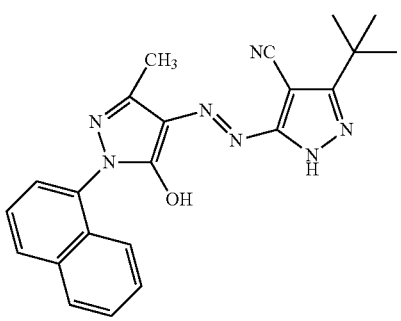
(L-27)

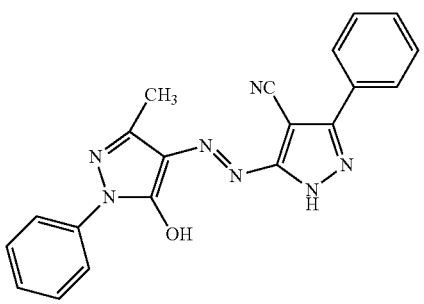
(L-28)

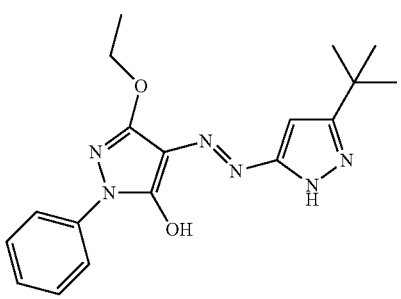
(L-29)

-continued

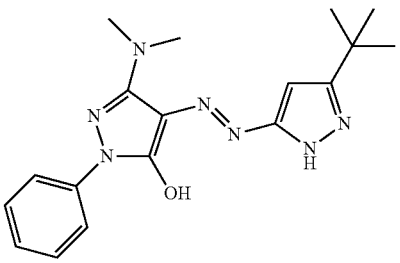
(L-30)

(L-31)

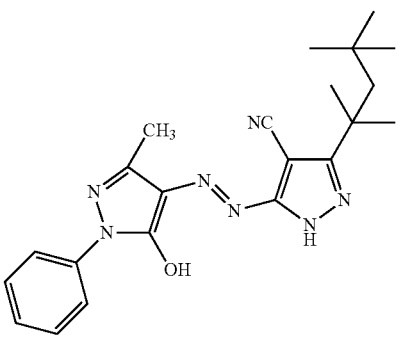

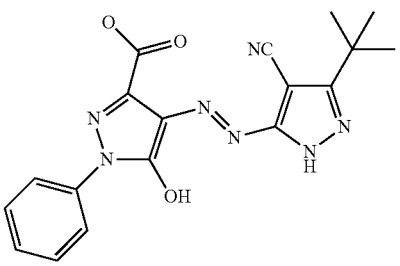
(L-32)

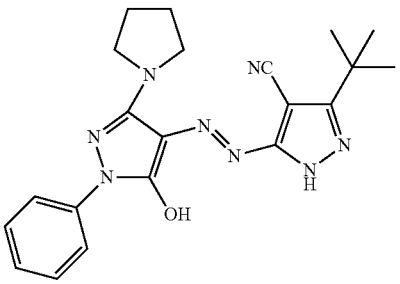
(L-33)

An azo metal complex dye having the same coordination structure as general formula (C) below is desirable, and the azo metal complex dye denoted by general formula (C) is preferred as the above azo metal complex dye.

[Chem. 18]

$$[(M^{2+})_7(L^{2-})_6(O^{2-})_p(OH^-)_q(L')_r]\cdot\{(X^{n-})_{1/n}\}_p \quad \text{General formula (C)}$$

Details of general formula (C) will be described below.

In general formula (C), $M^{2+}$ denotes a divalent transition metal ion. As set forth above, examples of divalent transition metal ions are $Mn^{2+}$, $Fe^{2+}$, $Co^{2+}$, $Ni^{2+}$, $Cu^{2+}$, $Ru^{2+}$, $Pd^{2+}$, and $Pt^{2+}$. $Mn^{2+}$, $Fe^{2+}$, $Co^{2+}$, $Ni^{2+}$, and $Cu^{2+}$ are desirable; $Co^{2+}$, $Ni^{2+}$, and $Cu^{2+}$ are preferred; and $Cu^{2+}$ is of greater preference.

Each of p and q denotes an integer falling within a range of 0 to 2, with p+q=2. p and q can change within the range satisfying p+q=2 depending on the state in which the compound is present and/or the type of $X^{n+}$.

$X^{n+}$ denotes a cation of valence n, with n denoting an integer falling within the range of 1 to 10. $X^{n+}$ is not specifically limited other than that it be of valence n. It is desirably an organic cation. Examples of organic cations are ammonium ions, amidinium ions, guanidinium ions, pyridinium ions, imidazolium ions, anilinium ions, and the dye cations described further below, that is, any of the cations denoted by general formulas (D) to (F). These may be substituted or unsubstituted, and two or more substituents may bond together to form a ring.

$X^{n+}$ desirably denotes ammonium ions or amidinium ions. Examples of the ammonium ions include unsubstituted ammonium, substituted or unsubstituted primary ammonium (for example, t-butanol), substituted or unsubstituted secondary ammonium (for example, dicyclohexylamine, diisopropylamine), substituted or unsubstituted tertiary ammonium (for example, triethylamine), and substituted or unsubstituted quaternary ammonium (for example, etrabutylammonium). The substituted or unsubstituted secondary ammonium and substituted or unsubstituted tertiary ammonium are preferred, with the substituted or unsubstituted secondary ammonium being of greater preference.

n is desirably an integer ranging from 1 to 4, preferably an integer of 1 or 2, and more preferably, 1.

In general formula (C), L' denotes a ligand. In the present invention, the term "ligand" means an atom, or group of atoms, capable of bonding with a metal ion. When plural ligands L' are present, they may be identical or different from each other. Examples of the ligand denoted by L', in addition to the ligands given as preferable examples further below, are the ligands described in "Photochemistry and Photophysics of Coordination Compounds," Springer-Verlag, H. Yersin, 1987, and "Organic Metal Compounds—Foundations and Applications," Shokabo K.K., Akio Yamamoto, 1982, which are expressly incorporated herein by reference in their entirety. Specific examples of ligands will be described below.

The atoms contained in L' that coordinate to metal ions are preferably nitrogen atoms, oxygen atoms, sulfur atoms, phosphorus atoms, and halogen atoms (such as chlorine atom, fluorine atom, bromine atom, and iodine atom); more preferably nitrogen atoms, oxygen atoms, and halogen atoms; more further preferably nitrogen atoms and oxygen atoms; and still more preferably, nitrogen atoms.

When L' is coordinated to a metal ion, L' may be either an anionic ligand or a neutral ligand.

Among the above, there is no limitation for L' coordinating to a metal ion through a nitrogen atom; examples are: nitrogen-containing aromatic heterocyclic ligands (such as pyridine ligands, pyrazine ligands, pyrimidine ligands, pyridazine ligands, triazine ligands, thiazole ligands, oxazole ligands, pyrrole ligands, imidazole ligands, pyrazole ligands, triazole ligands, oxadiazole ligands, thiadiazole ligands, condensed ligands containing the same (such as quinoline ligands, benzooxazole ligands, and benzimidazole ligands), and their tautomers); amine ligands (such as ammonia, methylamine, dimethylamine, diethylamine, dibenzylamine, triethylamine, piperidine, piperazine, morpholine, and arylamine); aniline ligands (such as aniline, N-methylaniline, N,N-dimethylaniline, N,N-diethylaniline, diphenylamine, N-acylaniline, and N-alkylsulfonylaniline); imine ligands; nitrile ligands (such as acetonitrile ligands); isonitrile ligands (such as t-butylisonitrile ligands), amide ligands (such as dimethylformamide ligands and dimethylacetamide ligands); amidine ligands (such as DBU and DBN); and guanidine ligands (such as tetramethylguanidine). The ligands may comprise substituents.

There is no limitation for L' coordinating to a metal ion through an oxygen atom; examples are: alcohol ligands (preferably having 1 to 30 carbon atoms, more preferably 1 to 20 carbon atoms, still more preferably 1 to 10 carbon atoms, such as methanol, ethanol, butanol, 2-ethylhexyloxy, and other monovalent anionic ligands from which a proton has been dissociated); aryloxy ligands (preferably having 6 to 30 carbon atoms, more preferably 6 to 20 carbon atoms, still more preferably 6 to 12 carbon atoms, such as phenol, 1-naphthol, 2-naphthol, and other monovalent anionic ligands from which a proton has been dissociated); diketone ligands (such as acetylacetone ligands); silyloxy ligands (preferably having 3 to 40 carbon atoms, more preferably 3 to 30 carbon atoms, still more preferably 3 to 24 carbon atoms, such as trimethylsilyloxy and triphenylsilyl oxy); ether ligands (including cyclic ethers); carboxylic acid ligands; sulfonic acid ligands; aqua ligands; and $O_2$ ligands. These ligands may comprise substituents.

There is no limitation for L' coordinating to a metal ion through a sulfur atom; examples are: alkylthiol ligands (preferably having 1 to 30 carbon atoms, more preferably 1 to 20 carbon atoms, still more preferably 1 to 12 carbon atoms, such as butanethiol and other monovalent anionic ligands from which a proton has been dissociated); arylthiol ligands (preferably having 6 to 30 carbon atoms, more preferably 6 to 20 carbon atoms, still more preferably 6 to 12 carbon atoms, such as thiophenol); and thioether ligands. These ligands may comprise substituents.

There is no limitation for L' coordinating to the metal ion through a phosphorus atom; examples are: alkylphosphine ligands (preferably having 2 to 30 carbon atoms, more preferably 2 to 20 carbon atoms, still more preferably 2 to 10 carbon atoms, such as methylphosphine, dimethylphosphine, diethylphosphine, and dibenzylphosphine); and arylphosphine ligands (preferably having 3 to 30 carbon atoms, more preferably 4 to 20 carbon atoms, still more preferably 5 to 10 carbon atoms, such as phenylphosphine, diphenylphosphine, and pyridylphosphine). These ligands may comprise substituents.

L' is desirably an organic base, with substituted or unsubstituted amines and substituted or unsubstituted amidines being desirable.

r denotes an integer falling within the range of 0 to 5, desirably an integer falling within the range of 0 to 3, preferably an integer falling within the range of 0 to 2, more preferably 0 or 1, and still more preferably, 0.

In general formula (C), $L^{2-}$ denotes a divalent anion in the form of the azo dye denoted by general formula (1) from which two hydrogen atoms have dissociated. The details of general formula (1) are as set forth above. The azo dye denoted by general formula (1) can become a divalent anion through dissociation of the dissociating hydrogen atom contained in the group denoted by Y and the dissociating hydrogen atom denoted by $Y^1$.

The methods described in Japanese Unexamined Patent Publication (KOKAI) Showa No. 61-36362 and English language family member U.S. Pat. No. 4,685,934, and Japanese Unexamined Patent Publication (KOKAI) No. 2006-57076 and English language family member US2008/0199615A1, which are expressly incorporated herein by reference in their entirety, are examples of common methods of synthesizing the azo dye denoted by general formula (1). However, there is no limitation to these methods; other reaction solvents and acids may be employed, and the coupling reaction may be conducted in the presence of a base (such as sodium acetate, pyridine, or sodium hydroxide). Specific examples of methods of synthesizing the azo dye are given below.

[Chem. 19]

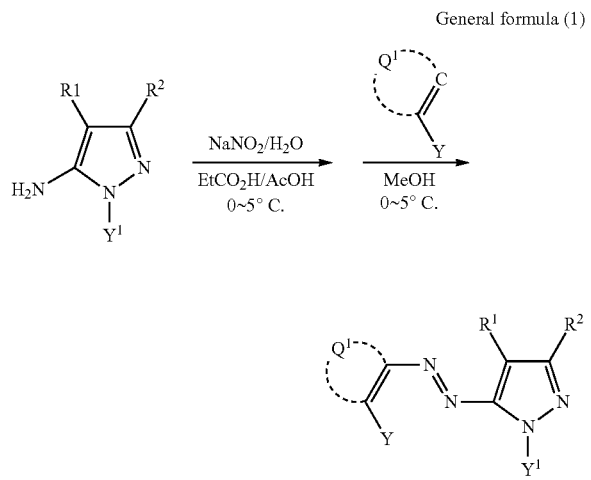

[Chem. 20]

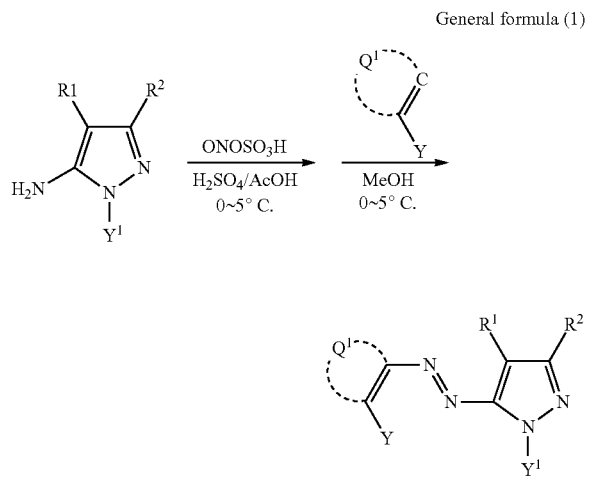

An example of the method of obtaining the azo metal complex dye by reacting an azo dye and a transition metal ion is the method of stirring the azo dye and a metal salt (which includes metal complexes and metal oxide salts) in an organic solvent, water, or a mixed solution of the two. When synthesizing the azo metal complex dye employed in the present invention, to obtain an azo metal complex dye comprising six azo dyes and seven transition metal ions per molecule, the reaction is desirably conducted in the presence of a base. The azo metal complex dye containing the azo dye denoted by general formula (1) as a ligand is desirably obtained by reacting the azo dye denoted by general formula (1) with a transition metal ion in the presence of a base. In the recording layer containing the azo metal complex dye thus obtained, a base (including protonated bases) will normally be contained in the azo metal complex and/or recording layer.

The base is not specifically limited. Ammonia and organic bases are desirable, and organic bases are preferred. Examples of organic bases are primary to tertiary amines (such as triethylamine, diisopropylamine, pyrrolidine, N-methylpyrrolidine, and tert-butylamine), amidines (such as DBU (1,8-diazabicyclo[5.4.0]-7-undecene) and DBN (1,5-diazabicyclo[4.3.0]-5-nonene)), guanidines (such as tetramethylguanidine), nitrogen-containing hetero rings (such as pyridine and imidazole), and tetrabutylammonium hydroxide.

Desirable examples of organic bases are substituted or unsubstituted primary to tertiary amines having 1 to 10 carbon atoms and substituted or unsubstituted amidines having 1 to 10 carbon atoms; preferred examples are substituted or unsubstituted secondary amines having 1 to 10 carbon atoms, substituted or unsubstituted tertiary amines having 1 to 10 carbon atoms, and substituted or unsubstituted amidines having 1 to 10 carbon atoms; and examples of greater preference are substituted or unsubstituted secondary amines having 1 to 10 carbon atoms and substituted or unsubstituted amidines having 1 to 10 carbon atoms.

When identified by MS such as ESI-TOF-MS, the above azo metal complex, such as an azo metal complex obtained by reacting compound (L-11) and copper ions in the presence of diisopropylamine, will sometimes be detected as a negative peak of M, sometimes as a negative peak of M/2, or the like where M denotes the molecular weight of the molecule that is formed from six azo ligand molecules and seven transition metals and contains two crosslinking ligands (such as oxygen ions or hydroxide ions). A simple base substance may also be detected. Monodentate ligands (in the base, solvent, or the like) are seldom detected as complexes, but are often detected as fragments.

X-ray structural analysis and elemental analysis can also be used to determine the structure of the complex. The X-ray structural analysis results of an azo metal complex obtained by reacting compound (L-11) and copper ions in the presence of diisopropylamine exhibited the following structure (referred to as "structure A", hereinafter). The $O^{2-}$ and $OH^-$ in the crosslinking ligands positioned in the center can both become $O^{2-}$ or both become $OH^-$. In structure A below, the solid line and dotted line do not have to clearly denote different bonds, but can also denote a resonating structure. The bonds between the ligands and the metal ions are not limited to what is represented by this notation; so long as they are present at sufficiently close positions, other bonds may also be present.

[Chem. 21]

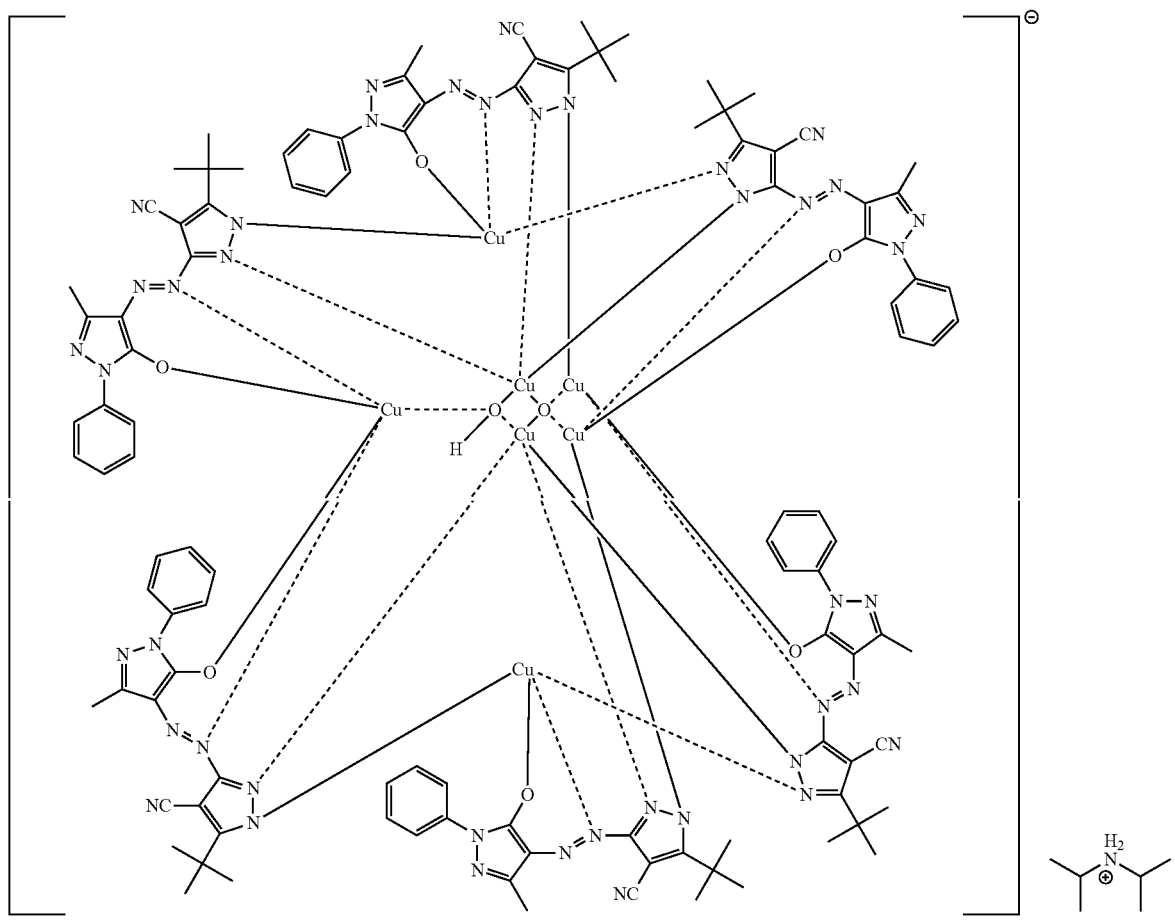

Structure A

The azo metal complex dye that is denoted by general formula (C) can be obtained by reacting the azo dye denoted by general formula (1) and the salt of a transition metal. The reaction is desirably conducted in the presence of a base. An organic base is desirably employed. This is because when employing an inorganic base, the metal ions in the base will sometimes form ion pairs with the azo ligands, making it difficult to obtain the desired azo metal complex. Examples of organic bases are the above-described organic bases. An alcohol such as methanol can be employed as the solvent. It is possible to obtain an azo metal complex dye having a desired ligand by selecting the base and solvent because the ligand denoted by L' in general formula (C) is derived from the base or solvent. In the present invention, the type of metal salt, type of base, organic solvent or mixture thereof, reaction temperature, and the like are not limited. Reaction conditions such as the concentration and blending proportions of the azo dye and metal salt in the reaction solution, the reaction temperature, and the reaction time can be suitably established. The fact that the targeted azo metal complex dye has been obtained can be confirmed by a known method such as ESI-MS, MALDI-MS, ESI-TOF-MS, MALDI-TOF-MS, ESR, X-ray structural analysis, ICP, elemental analysis, HPLC, or GC. Conducting the reaction in the presence of a base makes it possible to obtain an azo metal complex dye with good recording and reproduction characteristics when irradiation by a short wavelength laser beam, good light resistance, and good reproduction durability.

Specific examples of the azo metal complex dye denoted by general formula (C) are given below. Exemple compounds (M-101) to (M-112) described in Examples further below are also specific examples of the azo metal complex dye denoted by general formula (C). However, the present invention is not limited to these specific examples.

TABLE 1

| Example compound | Origin of $L^{2-}$ (azo dye employed) | Transition metal ion | $X^{n+}$ | (p, q, r) | L' |
|---|---|---|---|---|---|
| Compound (M-1) | (L-1) | $Cu^{2+}$ | $^iPr_2NH_2^+$ | (1, 1, 0) | — |
| Compound (M-2) | (L-2) | $Cu^{2+}$ | $DBUH^+$ | (1, 1, 0) | — |
| Compound (M-3) | (L-3) | $Cu^{2+}$ | $DBUH^+$ | (1, 1, 0) | — |
| Compound (M-4) | (L-4) | $Cu^{2+}$ | $^iPr_2NH_2^+$ | (1, 1, 0) | — |
| Compound (M-5) | (L-5) | $Cu^{2+}$ | $DBUH^+$ | (1, 1, 0) | — |
| Compound (M-6) | (L-6) | $Cu^{2+}$ | $DBUH^+$ | (1, 1, 0) | — |
| Compound (M-7) | (L-7) | $Cu^{2+}$ | $Et_3NH^+$ | (1, 1, 0) | — |
| Compound (M-8) | (L-8) | $Cu^{2+}$ | $DBUH^+$ | (1, 1, 0) | — |
| Compound (M-9) | (L-9) | $Cu^{2+}$ | $DBUH^+$ | (1, 1, 0) | — |
| Compound (M-10) | (L-10) | $Cu^{2+}$ | $DBUH^+$ | (1, 1, 0) | — |
| Compound (M-11) | (L-11) | $Cu^{2+}$ | $^iPr_2NH_2^+$ | (1, 1, 0) | — |
| Compound (M-12) | (L-11) | $Cu^{2+}$ | $DBUH^+$ | (1, 1, 0) | — |

TABLE 1-continued

| Example compound | Origin of L²⁻ (azo dye employed) | Transition metal ion | X^{n+} | (p, q, r) | L' |
|---|---|---|---|---|---|
| Compound (M-13) | (L-11) | $Cu^{2+}$ | $DBNH^+$ | (1, 1, 0) | — |
| Compound (M-14) | (L-11) | $Cu^{2+}$ | $NH_4^+$ | (1, 1, 0) | — |
| Compound (M-15) | (L-12) | $Cu^{2+}$ | $DBUH^+$ | (1, 1, 0) | — |
| Compound (M-16) | (L-12) | $Cu^{2+}$ | $^iPr_2NH_2^+$ | (1, 1, 0) | — |
| Compound (M-17) | (L-16) | $Cu^{2+}$ | $^iPr_2NH_2^+$ | (1, 1, 0) | — |
| Compound (M-18) | (L-16) | $Cu^{2+}$ | $DBUH^+$ | (1, 1, 0) | — |
| Compound (M-19) | (L-16) | $Cu^{2+}$ | $Et_3NH^+$ | (1, 1, 0) | — |
| Compound (M-20) | (L-16) | $Cu^{2+}$ | $DBUH^+$ | (1, 1, 0) | — |

TABLE 2

| Example compound | Origin of L²⁻ (azo dye employed) | Transition metal ion or starting material of the transition metal ion | X^{n+} | (p, q, r) | L' |
|---|---|---|---|---|---|
| Compound (M-21) | (L-17) | $Cu^{2+}$ | $^iPr_2NH_2^+$ | (1, 1, 0) | — |
| Compound (M-22) | (L-17) | $Cu^{2+}$ | $DBUH^+$ | (1, 1, 0) | — |
| Compound (M-23) | (L-17) | $Cu^{2+}$ | $Et_3NH^+$ | (1, 1, 0) | — |
| Compound (M-24) | (L-17) | $Cu^{2+}$ | $DBNH^+$ | (1, 1, 0) | — |
| Compound (M-25) | (L-18) | $Cu^{2+}$ | $^iPr_2NH_2^+$ | (1, 1, 0) | — |
| Compound (M-26) | (L-19) | $Cu^{2+}$ | $^iPr_2NH_2^+$ | (1, 1, 0) | — |
| Compound (M-27) | (L-20) | $Cu^{2+}$ | $DBUH^+$ | (1, 1, 0) | — |
| Compound (M-28) | (L-21) | $Cu^{2+}$ | $^iPr_2NH_2^+$ | (1, 1, 0) | — |
| Compound (M-29) | (L-22) | $Cu^{2+}$ | $^iPr_2NH_2^+$ | (1, 1, 0) | — |
| Compound (M-30) | (L-23) | $Cu^{2+}$ | $DBUH^+$ | (1, 1, 0) | — |
| Compound (M-31) | (L-24) | $Cu^{2+}$ | $DBUH^+$ | (1, 1, 0) | — |
| Compound (M-32) | (L-25) | $Cu^{2+}$ | $^iPr_2NH_2^+$ | (1, 1, 0) | — |
| Compound (M-33) | (L-11) | $Co^{2+}$ | $^iPr_2NH_2^+$ | (1, 1, 0) | — |
| Compound (M-34) | (L-11) | $Ni^{2+}$ | $^iPr_2NH_2^+$ | (1, 1, 0) | — |
| Compound (M-35) | (L-11) | $Fe^{2+}$ | $^iPr_2NH_2^+$ | (1, 1, 0) | — |
| Compound (M-36) | (L-11) | $Pt^{2+}$ | $^iPr_2NH_2^+$ | (1, 1, 0) | — |
| Compound (M-37) | (L-11) | $Co^{2+}$ | $DBUH^+$ | (1, 1, 0) | — |
| Compound (M-38) | (L-11) | $Ni^{2+}$ | $DBUH^+$ | (1, 1, 0) | — |
| Compound (M-39) | (L-11) | $Fe^{2+}$ | $DBUH^+$ | (1, 1, 0) | — |
| Compound (M-40) | (L-11) | $Mn^{2+}$ | $DBUH^+$ | (1, 1, 0) | — |
| Compound (M-41) | (L-11) | $Cu^{2+}$ | tert-Bu | (1, 1, 0) | — |
| Compound (M-42) | (L-11) | $Cu^{2+}$ | $Et_3NH^+$ | (1, 1, 0) | — |
| Compound (M-43) | (L-11) | $Cu^{2+}$ | $*cy_2NH_2^+$ | (1, 1, 0) | — |
| Compound (M-44) | (L-11) | $Cu^{2+}$ | $^{sec}Bu_2NH_2^+$ | (1, 1, 0) | — |
| Compound (M-45) | (L-15) | $Cu^{2+}$ | $^iPr_2NH_2^+$ | (1, 1, 0) | — |
| Compound (M-46) | (L-15) | $Cu^{2+}$ | tert-Bu | (1, 1, 0) | — |
| Compound (M-47) | (L-15) | $Cu^{2+}$ | $Et_3NH^+$ | (1, 1, 0) | — |
| Compound (M-48) | (L-15) | $Cu^{2+}$ | $*cy_2NH_2^+$ | (1, 1, 0) | — |
| Compound (M-49) | (L-15) | $Cu^{2+}$ | $^{sec}Bu_2NH_2^+$ | (1, 1, 0) | — |
| Compound (M-50) | (L-15) | $Cu^{2+}$ | $DBUH^+$ | (1, 1, 0) | — |
| Compound (M-51) | (L-15) | $Cu^{2+}$ | $DBNH^+$ | (1, 1, 0) | — |
| Compound (M-52) | (L-17) | $Cu^{2+}$ | tert-Bu | (1, 1, 0) | — |
| Compound (M-53) | (L-17) | $Cu^{2+}$ | $*cy_2NH_2^+$ | (1, 1, 0) | — |
| Compound (M-54) | (L-17) | $Cu^{2+}$ | $^{sec}Bu_2NH_2^+$ | (1, 1, 0) | — |

*Dicyclohexylammonium

The optical information recording medium of the present invention contains the at least one azo metal complex dye descrived above in the recording layer. One or multiple different azo metal complex dyes may be contained in the recording layer. The content of the azo metal complex dye in the recording layer, for example, falls within a range of 1 to 100 mass percent, desirably falls within a range of 70 to 100 mass percent, preferably falls within a range of 80 to 100 mass percent, and optimally falls within a range of 90 to 100 mass percent of the total mass of the recording layer.

The azo metal complex dye can afford good recording and reproduction characteristics as set forth above, and has good light resistance and the like. This good performance can be further enhanced in some cases by use in combination with other components. It suffices to select optimal components that can be employed in combination to enhance performance based on the objective. Examples of components that are desirably used in combination are: (i) cationic dyes having absorption at a wavelength of 405 nm and (ii) the neutral dyes described below.

The embodiments of combined use with (i) and (ii) above will be sequentially described.

(i) Cationic Dyes Having Absorption at a Wavelength of 405 nm

In the optical information recording medium of the present invention, the recording layer can contain a cationic dye having absorption at a wavelength of 405 nm in addition to the azo metal complex. The combined use of a cationic dye can enhance recording characteristics, particularly recording characteristics in optical information recording media corresponding to short wavelength laser beams, such as BDs. The cationic dye is thought to have the effect of increasing the sensitivity of the azo metal complex dye. The combined use of a cationic dye can also be anticipated to enhance the film producing property and light resistance of the recording layer. This is thought to be the result of the cationic dye contributing to stabilization of the azo metal complex dye in the recording layer.

In the present invention, the phrase "has absorption at a wavelength of 405 nm" means that the molar extinction coefficient at a wavelength of 405 nm is equal to or greater than 10,000 L·mol$^{-1}$·cm$^{-1}$. From the perspective of improving recording characteristics in an optical information recording medium for a short wavelength laser beam, such as a BD, the molar extinction coefficient is preferably equal to or greater than 30,000 L·mol$^{-1}$·cm$^{-1}$. From the perspective of the tracking suitability of a Blu-ray disc, the molar extinction coefficient at a wavelength of 405 nm is desirably equal to or greater than 150,000 L·mol$^{-1}$·cm$^{-1}$ when the molecular weight of the cationic portion is equal to or less than 400, for example.

A dye with a cationic dye moiety having absorption at a wavelength of 405 nm will suffice as the cationic dye. From the perspective of the sensitivity-enhancing effect, strong absorption over the recording wavelength range is desirable, and a maximum absorption wavelength is preferably present in the recording wavelength region. From the perspective of the sensitivity-enhancing effect, in an optical information recording medium for a short wavelength laser beam, such as a BD, a methine dye as represented by a cyanine dye is an example of the cationic dye. Additionally, cationic groups can be introduced into azomethine dyes, azo dyes, merocyanine dyes, phthalocyanine dyes, quinone dyes, and the like to obtain cationic dyes. There are neutral and anionic dyes in which one or two anionic groups (such as —$SO_3^-$ and —$CO_2^-$ groups) are present at terminal positions in a substituent. These cases are also included as exceptions among the cationic dyes in the present invention. Among them, cyanine dyes and merocyanine dyes that efficiently absorb light in the vicinity of 405 nm in particular are desirable, and cationic dyes having cationic dye moieties denoted by any of general formulas (D) to (F) are preferred. From the perspectives of light resistance, solution stability, and the like, the cyanine dye denoted by general formula (D) is of greater preference. From the perspective of enhancing recording characteristics, the use of a dye with a maximum absorption wavelength in the 385 to 450 nm wavelength range is preferred as the cationic dye, and the use of a dye with a maximum absorption wavelength in the 385 to 430 nm wavelength range is of greater preference. In this context, the term "maximum absorption wavelength" means a maximum absorption wavelength as measured in an alcohol solvent with 1 to 3 carbon atoms, such as in methanol. From the perspective of the sensitivity-enhancing effect, the use of a cationic dye having stronger absorption than the azo metal complex dye at the recording wavelength is desirable. This is because the cationic dye generates heat by absorbing the recording beam, and this heat generation has the effect of promoting the thermal decomposition of the azo metal complex dye, which is thought to enhance recording sensitivity. In addition to the above characteristics, the cationic dye that is employed in the recording layer is desirably selected to have good solubility in solvent, good film forming properties, and a thermal decomposition temperature that is about the same as the azo metal complex dye with which it is being used in combination. The thermal decomposition temperatures of the azo metal complex dye and the cationic dye are desirably equal to or higher than 150° C. and equal to or lower than 500° C., preferably equal to or higher than 200° C. and equal to or lower than 400° C., and more preferably, equal to or higher than 250 degrees and equal to or lower than 350° C. In the present invention, the term "thermal decomposition temperature" means the point at which the mass loss ratio reaches 10 percent in TG/TDA measurement. In this case, the TG/TDA measurement is conducted by raising the temperature by 10° C./minute over a range from 30° C. to 550° C. under a $N_2$ gas flow (with a flow rate of 200 mL/minute). The measurement device employed is an EXSTAR 6000 made by Seiko Instruments, Inc.

Details of general formulas (D) to (F) will be sequentially described below. In general formulas (D) and (E), "- - - -" denotes a single bond or a double bond.

[Chem. 22]

General formula (D)

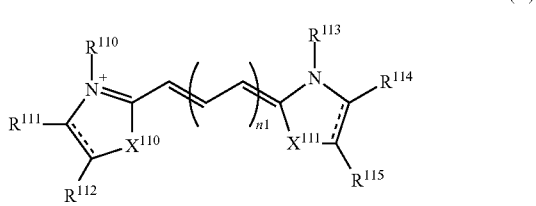

In general formula (D), each of $X^{110}$ and $X^{111}$ independently denotes a carbon atom, oxygen atom, nitrogen atom, or sulfur atom. From the perspective of the sensitizing effect on the azo metal complex dye, $X^{110}$ and $X^{111}$ desirably denote sulfur atoms or oxygen atoms.

Each of $R^{110}$, $R^{111}$, $R^{112}$, $R^{113}$, $R^{114}$, and $R^{115}$ independently denotes a hydrogen atom or a substituent. Examples of the substituents are the groups given by way of example for the substituents denoted by $R^1$ and $R^2$ in general formula (A).

The substituents denoted by $R^{110}$, $R^{113}$ are desirably substituted or unsubstituted alkyl groups having 1 to 10 carbon atoms; preferably substituted or unsubstituted alkyl groups having 1 to 4 carbon atoms; and more preferably, substituted or unsubstituted alkyl groups having 1 to 2 carbon atoms. Examples of substituents substituted onto these various groups are the groups given by way of example for the substituents denoted by $R^1$ and $R^2$ in general formula (A). From the perspective of stability of the compound, $R^{110}$ and $R^{113}$ are desirably substituted.

$R^{111}$ and $R^{112}$, and $R^{114}$, and $R^{115}$, may bond together to form a ring structure. When $8^{111}$ and $R^{112}$, and $R^{114}$ and $R^{115}$ are bonded together to form a ring structure, "- - - -" desirably denotes a double bond, and is desirably part of an aromatic ring. When part of an aromatic ring, the aromatic ring is desirably a substituted or unsubstituted benzene ring.

When $R^{111}$ and $R^{112}$, and $R^{114}$ and $R^{115}$, bond together to form a ring structure, the following condensed rings are examples of a condensed ring formed with $R^{111}$, $R^{112}$, and a nitrogen-containing five-membered ring on which $R^{111}$ and $R^{112}$ substitute and those of a condensed ring formed with $R^{114}$, $R^{115}$ and a nitrogen-containing five-membered ring on which $R^{114}$ and $R^{115}$ substitute. However, the present invention is not limited thereto.

[Chem. 23]

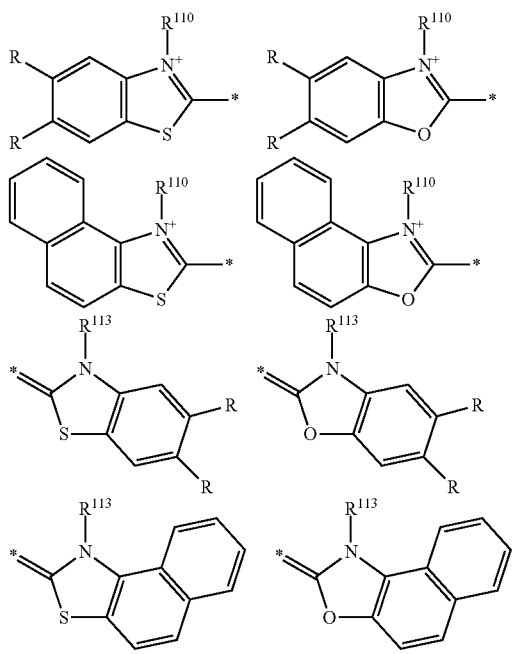

[In the above formulas, R denotes a hydrogen atom or a substituent (such as an alkyl group or halogen atom). The plural Rs that are present is identical to or different from each other. "*" denotes a bonding position with a carbon atom.]

In general formula (D), n1 denotes an integer of equal to or greater than 0. From the perspective of the absorption wavelength, n1 preferably denotes 0 or 1. From the perspectives of light resistance and solution stability, n1 is preferably 0 and $R^{111}$ and $R^{112}$, and $R^{114}$, and $R^{115}$ join together to form a ring structure.

[Chem. 24]

General formula (E)

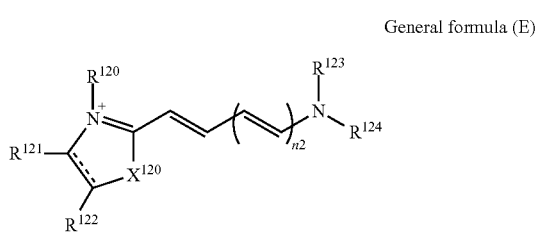

In general formula (E), $X^{120}$ denotes a carbon atom, oxygen atom, nitrogen atom, or sulfur atom. From the perspective of the sensitivity-enhancing effect on the azo metal complex dye, a sulfur atom or an oxygen atom is desirable.

In general formula (E), each of $R^{120}$, $R^{121}$, and $R^{122}$ independently denotes a hydrogen atom or a substituent. The details of substituents denoted by $R^{120}$, $R^{121}$, and $R^{122}$ are identical to those for the substituents denoted by $R^{110}$, $R^{111}$, and $R^{112}$, respectively, in general formula (D).

$R^{121}$ and $R^{122}$ can join together to form a ring structure. The details of the ring structure when $R^{121}$ and $R^{122}$ joint together to form a ring structure are as set forth above for the ring structure formed by $R^{111}$ and $R^{112}$ in general formula (D).

In general formula (E), each of $R^{123}$ and $R^{124}$ independently denotes a substituent, and can join together to form a ring structure. Examples of the substituents denoted by $R^{123}$ and $R^{124}$ are the groups given by way of example for the substituents denoted by $R^1$ and $R^2$ in general formula (A). Substituted or unsubstituted alkyl groups having 1 to 10 carbon atoms and substituted or unsubstituted aryl groups having 6 to 10 carbon atoms are desirable as these substituents. It is also possible for a ring containing any from among carbon, nitrogen, oxygen, and sulfur atoms to be formed in the $R^{123}$—N—$R^{124}$ moiety. The substituents denoted by $R^{123}$ and $R^{124}$ are preferably substituted or unsubstituted alkyl groups having 1 to 10 carbon atoms, or form a substituted or unsubstituted five to seven-membered ring comprised of carbon and nitrogen atoms or a substituted or unsubstituted five to seven-membered ring comprised of carbon, nitrogen, and sulfur atoms in the $R^{123}$—N—$R^{124}$ moiety. More preferably, they form a substituted or unsubstituted five or six-membered ring comprised of carbon and nitrogen atoms, or a substituted or unsubstituted five or six-membered ring comprised of carbon, nitrogen, and sulfur atoms. Still more preferably, they form a substituted or unsubstituted six-membered ring comprised of carbon and nitrogen atoms or a substituted or unsubstituted six-membered ring comprised of carbon, nitrogen, and sulfur atoms. Examples of the substituents on the various above groups or rings are the groups given by way of example for the substituents denoted by $R^1$ and $R^2$ in general formula (A).

In general formula (E), n2 denotes an integer of equal to or greater than 0. From the perspective of the absorption wavelength, n2 desirably denotes 0.

[Chem. 25]

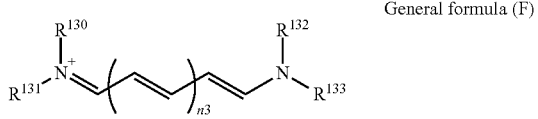

General formula (F)

In general formula (F), each of $R^{130}$, $R^{131}$, $R^{132}$ and $R^{133}$ independently denotes a substituent, it being possible for $R^{130}$ and $R^{131}$, $R^{132}$ and $R^{133}$ to join together to form a ring structure. The details of the substituents denoted by $R^{130}$, $R^{131}$, $R^{132}$, and $R^{133}$ are identical to those for the substituents denoted by $R^{123}$ and $R^{124}$ in general formula (D).

In general formula (F), n3 denotes an integer of equal to or grater than 0. From the perspective of the absorption wavelength, n3 desirably denotes 1.

From the perspective of the absorption wavelength, the cationic dye moieties denoted by general formulas (D) to (F) are desirably monovalent or divalent cations.

The cationic dye moieties denoted by general formulas (D) to (F) can exist in a state achieved by forming salts quantities of counter anions to neutralize the charge within the molecule. The counter anions need only neutralize the charge within the molecule, and may be anions in the form of single atoms or groups of atoms. They may also be incorporated as substituents into the cationic dye. When employing a cationic dye in combination with the azo metal complex dye, halide ions, alkyl or aryl sulfonic acid ions, nitric acid ions, alkyl or aryl carboxylic acid ions, alkoxide ions, $PF_6^-$ ions, $BF_4^-$ ions, and $ClO_4^-$ ions are desirable; chloride ions, bromide ions, iodine ions, alkyl or aryl sulfonic acid ions, alkyl or aryl carboxylic acid ions, $PF_6^-$ ions, $BF_4^-$ ions, and $ClO_4^-$ ions are preferred; and alkyl or aryl sulfonic acid ions are of greater preference as counter anions to the cationic dye from the perspective of absorption wavelength.

Cationic dyes having the cationic dye moieties denoted by general formulas (D) to (F) can be synthesized by known methods and are available as commercial products. For example, synthesis methods are described in detail in "The Chemistry of Synthetic Dyes" (Academic Press, K. Venkataraman, published in 1971, which is expressly incorporated herein by reference in its entirety) and their references. Reference can also be made to WO01/44374, which is expressly incorporated herein by reference in its entirety, and the like.

Specific examples of the cationic dye suitable for use in the present invention will be given below. However, the present invention is not limited to the following specific examples.

[Chem. 26]

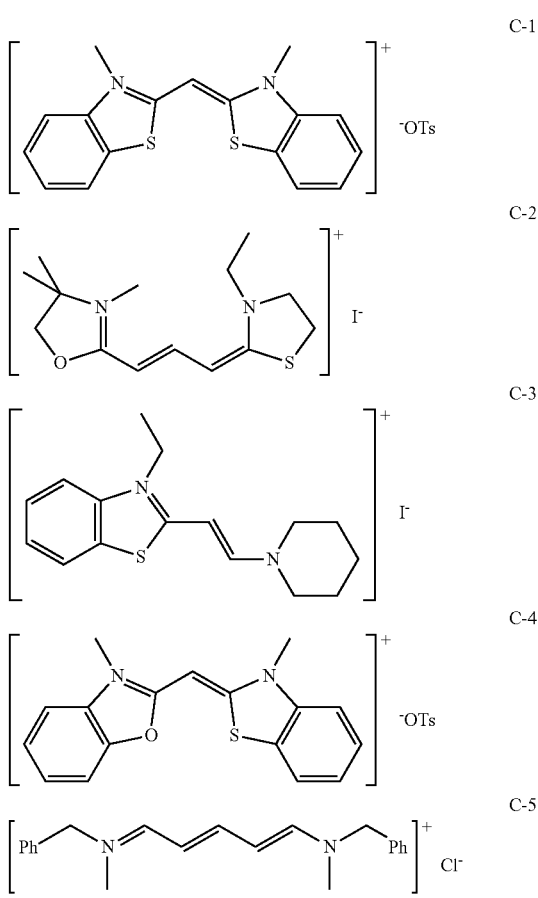

The azo metal complex dye can be a nonionic dye or an anionic dye. When the azo metal complex dye is a nonionic dye, the azo metal complex dye and the cationic dye can be in a state in which the cationic dye forms a salt with counter anions. In that case, the azo metal complex dye and the cationic dye do not form a complex salt, but can be present in a mixed state in the recording layer. When the azo metal complex dye is an anionic dye, the azo metal complex dye and the cationic dye can be present in the form of a complex in the recording layer. The complex salt can be one which contains the azo metal complex dye and the cationic dye as structural components, and, in addition to the azo metal complex dye and the cationic dye, can contain other components, such as ligands. Since excess salt can be removed by having the azo metal complex dye and cationic dye form a complex salt, it is thought that a recording layer affording better recording characteristics can be obtained.

When the azo metal complex dye and the cationic dye are present in a mixed state, the blending ratio by mass of the azo metal complex dye and the cationic dye in the recording layer is desirably azo metal complex dye:cationic dye=95:5 to 50:50. When this mass ratio is equal to or greater than 95:5, the cationic dye can efficiently produce a sensitivity-enhancing effect. When equal to or less than 50:50, it is possible to maintain good light resistance and solution stability of the azo metal complex dye in the recording layer. This mass ratio is preferably 95:5 to 80:20, and more preferably, 95:5 to 90:10. When employing the cationic dye in combination, the content of the azo metal complex dye in the recording layer, for example, falls within a range of 50 to 95 mass percent, desirably falls within a range of 70 to 95 mass percent, preferably falls within a range of 80 to 95 mass percent, and optimally falls within a range of 90 to 95 mass percent of the total mass of the recording layer.

When the azo metal complex dye and the cationic dye are present in the form of a complex salt, the content of the complex salt in the recording layer, for examples, falls within a range of 1 to 100 mass percent, desirably falls within a range of 70 to 100 mass percent, preferably falls within a range of 80 to 100 mass percent, and optimally falls within a range of 90 to 100 mass percent of the total mass of the recording layer.

To cause the azo metal complex dye and cationic dye to be present in the form of a complex salt in the recording layer, it is desirable to remove in advance the complex salt as a solid by mixing the azo metal complex dye and cationic dye, or the like, and employ the solid to prepare the recording layer. This permits the removal of excess salt, thereby further promoting the sensitivity-enhancing effect of the cationic dye.

(ii) Neutral Dye

In the optical information recording medium of the present invention, a neutral dye in the form of a complex of the azo compound denoted by general formula (G) below and a metal ion or metal oxide ion can be incorporated in addition to the azo metal complex dye. General formula (G) shows only the azo form in the azo-hydrazone tautomeric equilibrium, but the corresponding hydrazone form is also acceptable.

[Chem. 27]

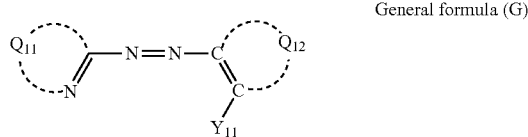

General formula (G)

[In general formula (G), $Q^{11}$ denotes an atom group forming a nitrogen-containing hetero ring, $Q^{12}$ denotes an atom group forming a hetero ring or a carbon ring, and $Y^{11}$ denotes a group containing a hydrogen atom that may dissociate during the formation of the complex.]

Although the reason is unclear, employing the azo metal complex dye and neutral dye in combination can enhance recording characteristics, particularly light resistance in the recording layer and recording characteristics, especially in optical information recording media for short wavelength laser beams, such as BDs. In the present invention, the term, "neutral dye" refers to a dye in which the metal ions are neutralized by ligands and no counter ions are present that are not bonded to metal ions.

The neutral dye will be described below.

In general formula (G), $Q^{11}$ denotes an atom group forming a nitrogen-containing hetero ring. The nitrogen-containing hetero ring formed by $Q^{11}$ is not specifically limited. Examples are a pyrazole ring, pyrrole ring, imidazole ring, thiazole ring, isothiazole ring, oxazole ring, isooxazole ring, 1,2,4-thiadiazole ring, 1,3,4-thiadiazole ring, pyridine ring, pyrazine ring, pyrimidine ring, pyridazine ring, and triazole ring. From the perspective of further enhancing the performance of the azo metal complex dye, the nitrogen-containing hetero ring is desirably an isooxazole ring, oxazole ring, thiazole ring, 1,2,4-thiadiazole ring, 1,3,4-thiadiazole ring, or triazole ring.

$Q^{12}$ denotes an atom group forming a hetero ring or a carbon ring. The ring formed by $Q^{12}$ need only be a ring that is formed by carbon atoms and hetero atoms (oxygen atoms, sulfur atoms, nitrogen atoms, and the like), and is otherwise not specifically limited. Examples are a benzene ring, pyrazole ring, pyrrole ring, furan ring, thiophene ring, imidazole ring, thiazole ring, isothiazole ring, oxazole ring, isooxazole ring, pyridine ring, pyrazine ring, pyrimidine ring, pyridazine ring, and rings denoted by partial structures (C-1) to (C-7) below. These rings may have substituents and may be condensed rings.

In general formula (G), specific examples of the following partial structure:

[Chem. 28]

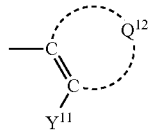

are desirably the following partial structures (C-1) to (C-7). The following partial structures are embodiments in which $Y^{11}$ in general formula (G) is a hydroxyl group.

[Chem. 29]

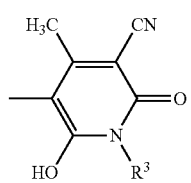

(C-1)

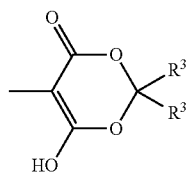

(C-2)

-continued

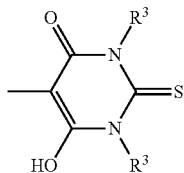
(C-3)

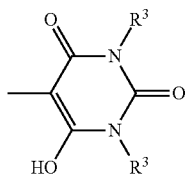
(C-4)

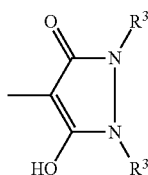
(C-5)

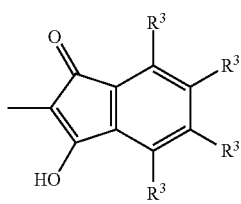
(C-6)

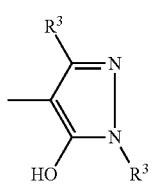
(C-7)

Above, $R^3$ denotes a hydrogen atom or a substituent, and separate instances of $R^3$ may be mutually identical or different. Separate instances of $R^3$ may be bonded together through a linking group. $R^3$ is desirably a substituent. As a substituent, it is not specifically limited. Examples are an alkyl group (desirably having 1 to 30 carbon atoms, preferably having 1 to 20 carbon atoms, and more preferably having 1 to 10 carbon atoms, such as a methyl group, ethyl group, iso-propyl group, tert-butyl group, n-octyl group, n-decyl group, n-hexadecyl group, cyclopropyl group, cyclopentyl group, or cyclohexyl group) and an aryl group (desirably having 6 to 30 carbon atoms, preferably having 6 to 20 carbon atoms, and more preferably having 6 to 12 carbon atoms, such as a phenyl group, p-methylphenyl group, naphthyl group, anthranyl group, pyridyl group, thiazole group, oxazole group, or triazole group).

The atom groups denoted by $Q^{11}$ and $Q^{12}$ may comprise substituents. From the perspective of solubility in coating solvents, the presence of a substituent is desirable. The substituent is not specifically limited; examples are the substituents given in the description of $R^1$ and $R^2$ above.

$Y^{11}$ denotes a group containing a hydrogen atom (dissociating hydrogen atom) that can dissociate during formation of the complex. The group denoted by $Y^{11}$ is not specifically limited. Examples are a hydroxyl group, thiol group, amino group, carboxyl group, and sulfonyl group. $Y^{11}$ desirably denotes a hydroxyl group.

The neutral dye is a complex of the azo compound and a metal ion or metal oxide ion. It is a dye that is produced by reacting an azo compound and a metal ion or metal oxide ion to coordinate bond the azo compound to the metal ion. During formation of the complex, in the azo compound denoted by general formula (G) that will become the ligand, the dissociating hydrogen atom contained in the group denoted by $Y_{11}$ desirably dissociates, forming an anionic group.

Examples of the metal ion are metal ions of Mg, Al, Si, Ca, Sc, Ti, V, Cr, Mn, Fe, Co, Ni, Cu, Zn, Ga, Ge, As, Sr, Y, Zr, Nb, Mo, Tc, Ru, Rh, Pd, Ag, Cd, In, Sn, Sb, Ba, Pr, Eu, Yb, Hf, Ta, W, Re, Os, Ir, Pt, Au, Hg, Tl, Pb, Bi, and Th. Of these, ions of transition metal atoms are desirable. Examples of metal oxide ions are oxide ions of the above metals.

The transition metal atoms referred to in reference to the neutral dye are as set forth above. The transition metal atoms contained in the neutral dye are not specifically limited. Mn, Fe, Co, Ni, and Cu are desirable; Fe, Co, Ni, and Cu are preferred; and Fe, Co, and Ni are of greater preference.

Divalent and trivalent metal atoms are desirable and divalent metal atoms are preferred as the metal ions. Examples of divalent and trivalent metals (denoted as metal ions) are: $Mn^{2+}$, $Fe^{2+}$, $Fe^{3+}$, $Co^{2+}$, $Co^{3+}$, $Ni^{2+}$, $Ni^{3+}$, $Cu^{2+}$, $Zn^{2+}$, $Cr^{3+}$, $Ru^{2+}$, $Rh^{3+}$, $Pd^{2+}$, $Ir^{3+}$, and $Pt^{2+}$. $Mn^{2+}$, $Fe^{2+}$, $Co^{2+}$, $Ni^{2+}$, and $Cu^{2+}$ are desirable, and $Fe^{2+}$, $Co^{2+}$, $Ni^{2+}$, and $Cu^{2+}$ are preferred.

Examples of general methods of synthesizing the azo compound denoted by general formula (G) are the methods described in Japanese Unexamined Patent Publication (KOKAI) Showa No. 61-36362, English language family member U.S. Pat. No. 4,685,934, Japanese Unexamined Patent Publication (KOKAI) No. 2006-57076, and English language family member US2008/0199615A1. However, they are not limited thereto. Other acids and reaction solvents may be employed, and the coupling reaction may be conducted in the presence of a base (such as sodium acetate, pyridine, or sodium hydroxide).

As an example of a general method of obtaining a metal-azo chelate dye by reacting an azo compound and a metal ion (or a metal oxide ion), the azo compound and a metal salt (including metal complexes and metal oxide salts) are stirred in the presence of a base in an organic solvent, water, or a mixture of the two. The type of metal salt, the type of base, the type of organic solvent or mixed solution thereof, the reaction temperature, and the like are not limited. For example, methanol can be used as the reaction solvent. Any solvent that will dissolve the metal ion and ligand employed will do; there is no limitation to methanol. An organic base is desirable as the base. Examples of organic bases are primary to tertiary amines with 1 to 30 carbon atoms (such as triethylamine, diisopropylamine, pyrrolidine, N-methylpyrrolidine, and t-butylamine), amidines (such as DBU (1,8-diazabicyclo[5.4.0]-7-undecene) and DBN (1,5-diazabicyclo[4.3.0]-5-nonene)), guanidines (such as tetramethylguanidine), nitrogen-containing hetero rings (such as pyridine and imidazole), and tetrabutylammonium hydroxide. Primary to tertiary amines having 1 to 30 carbon atoms are desirable, primary to tertiary amines having 1 to 20 carbon atoms are preferred, and primary to tertiary amines having 1 to 10 carbon atoms are of greater preference as organic bases.

Specific examples of the neutral dye will be given below. However, the present invention is not limited to the following specific examples.

[Chem. 30]
(S-1)
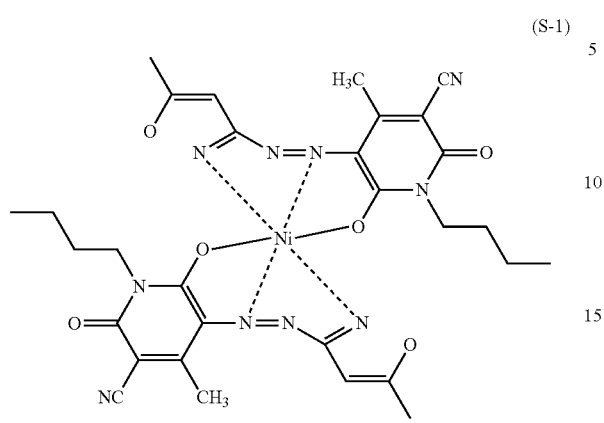
(S-2)
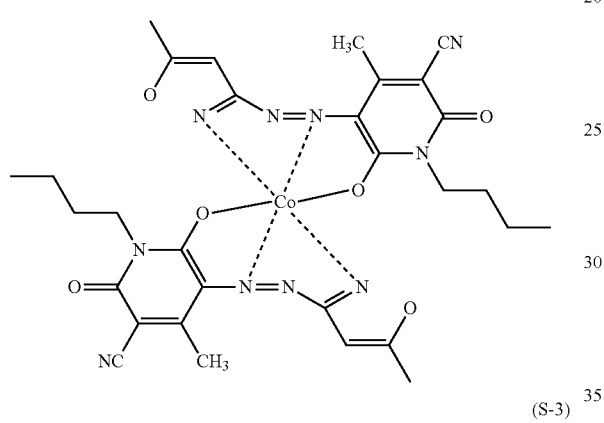
(S-3)
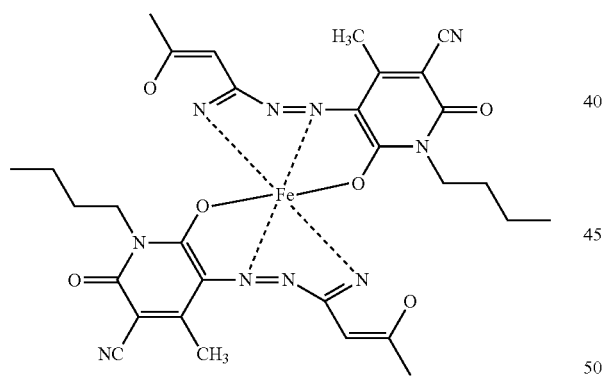
(S-4)
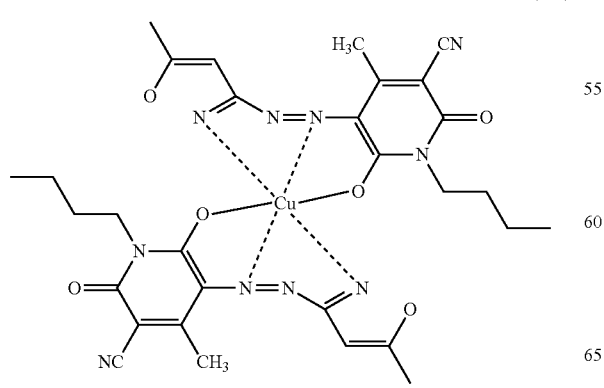
-continued
(S-5)
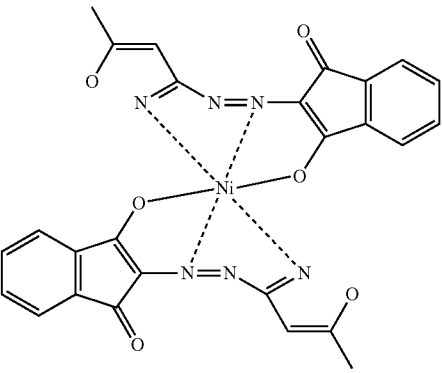
(S-6)
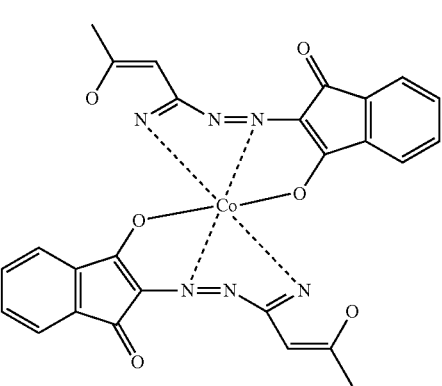
(S-7)
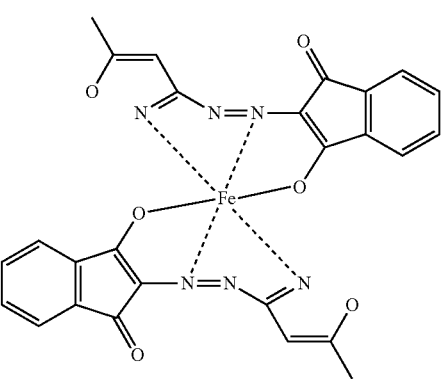
(S-8)
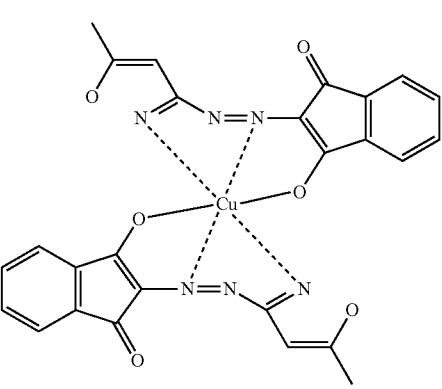

-continued
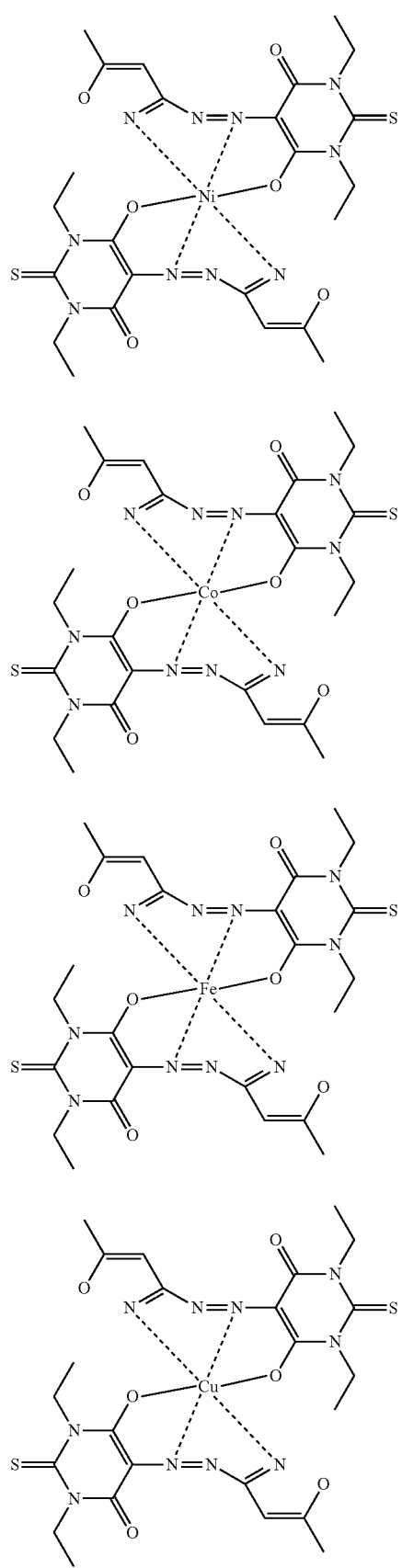
(S-9)
(S-10)
(S-11)
(S-12)
-continued
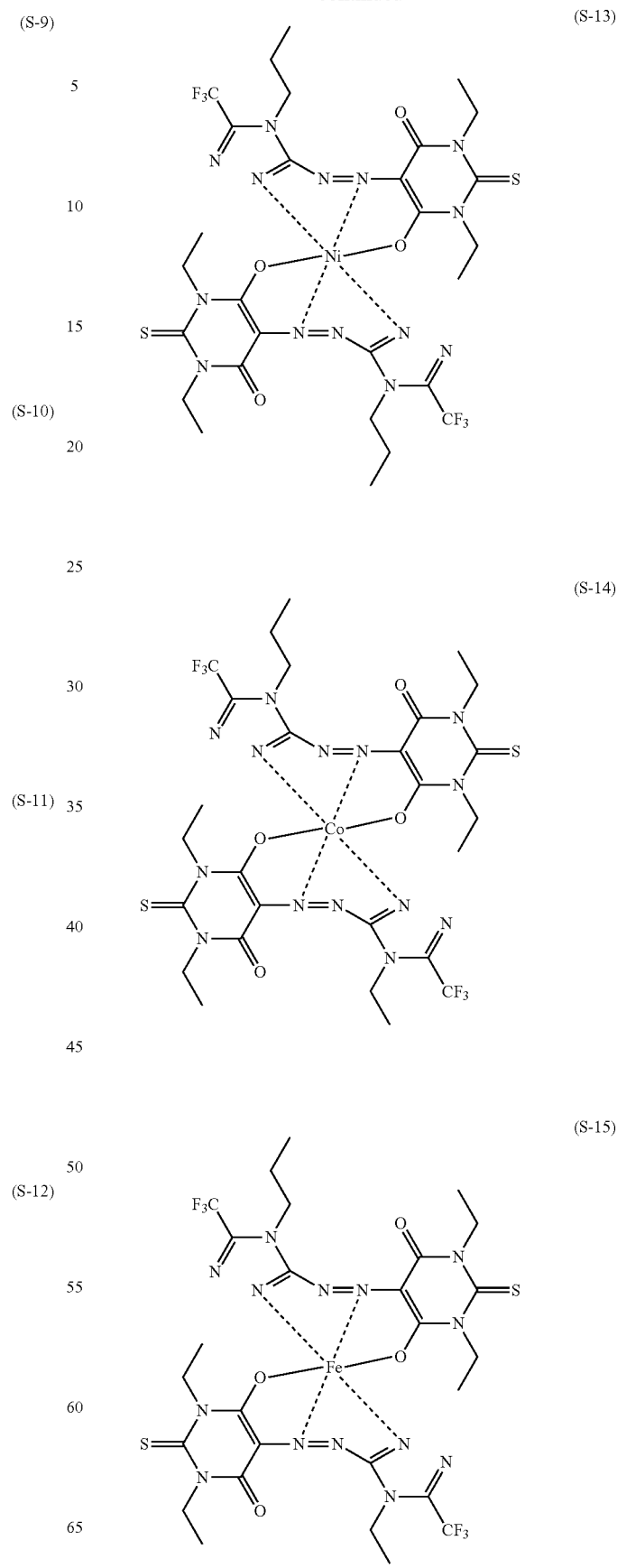
(S-13)
(S-14)
(S-15)

(S-16)
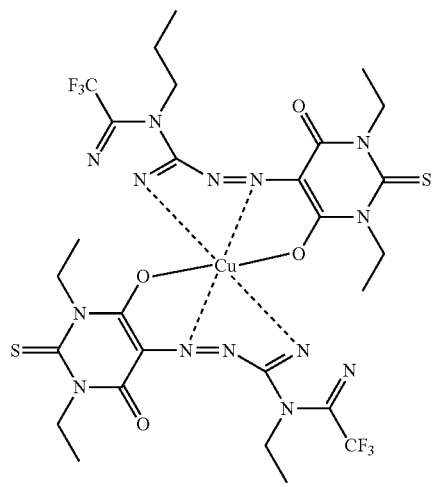
(S-17)
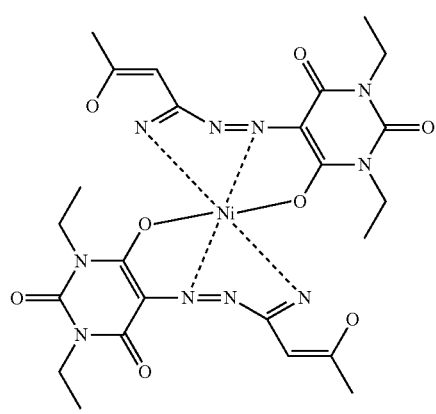
(S-18)
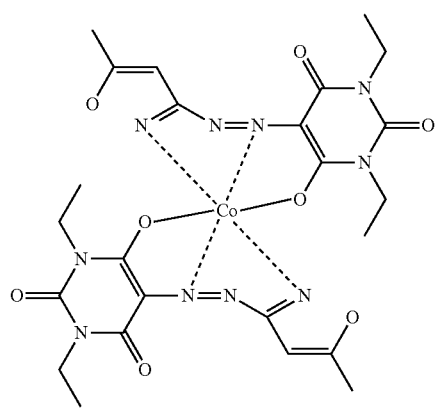
(S-19)
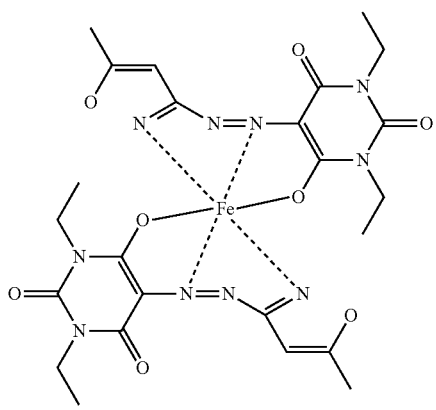
(S-20)
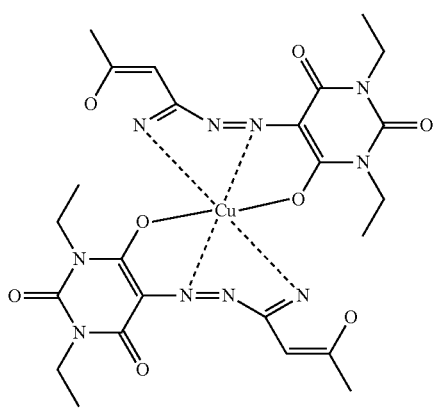
(S-21)
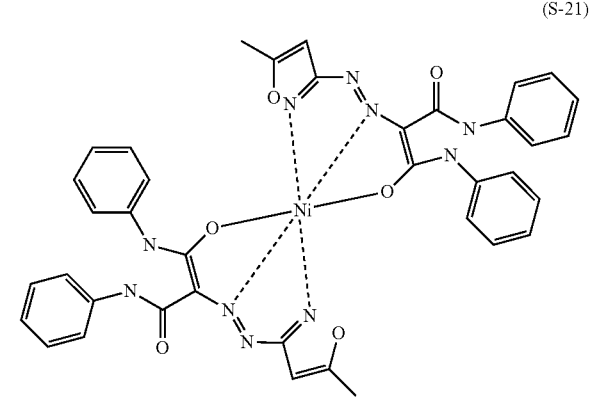
(S-22)
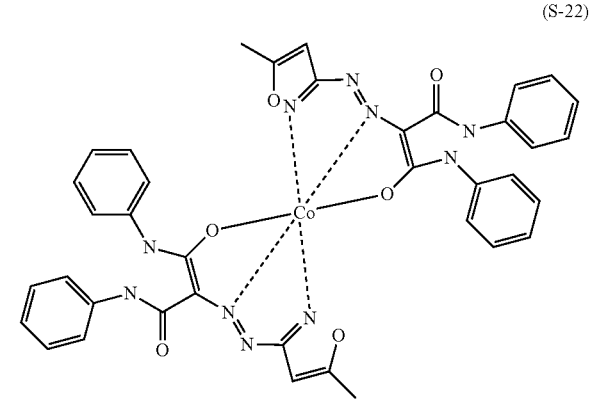

(S-23)
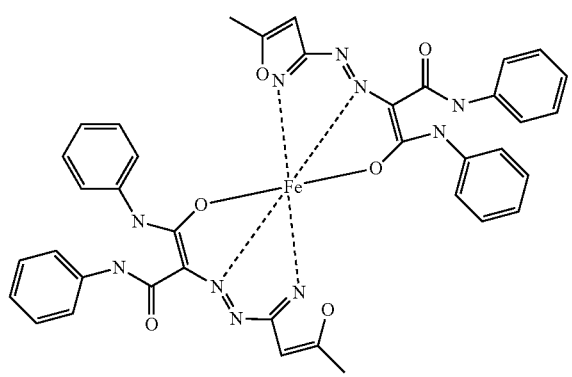

(S-24)
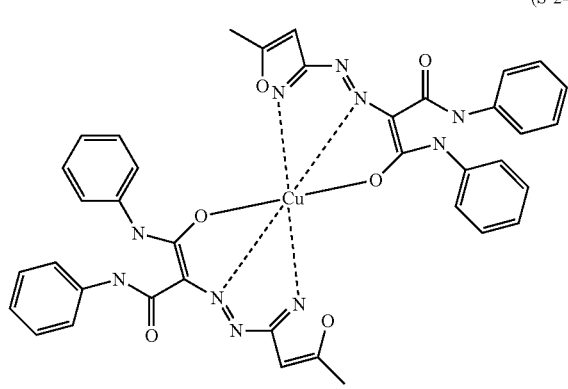

(S-25)
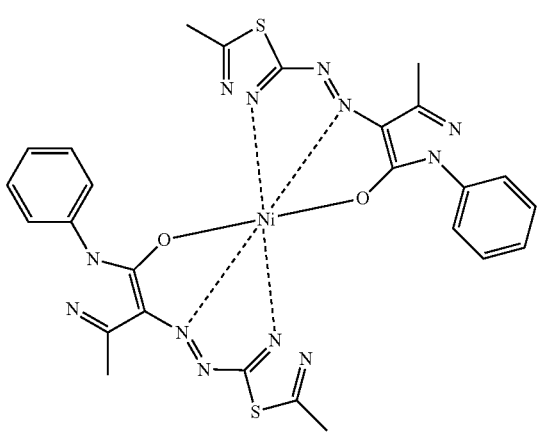

(S-26)
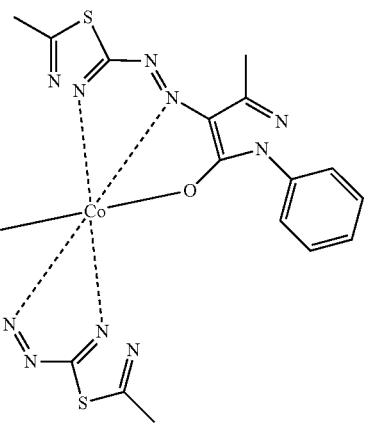

(S-27)
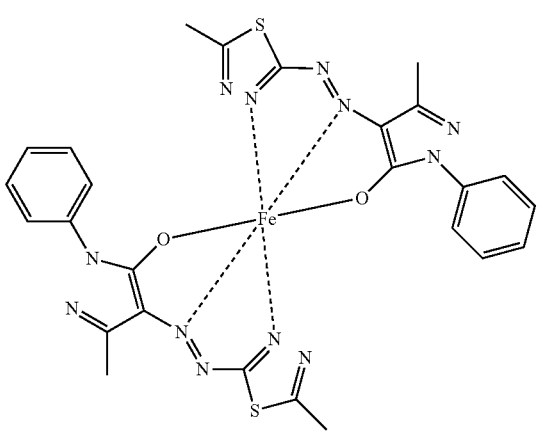

(S-28)
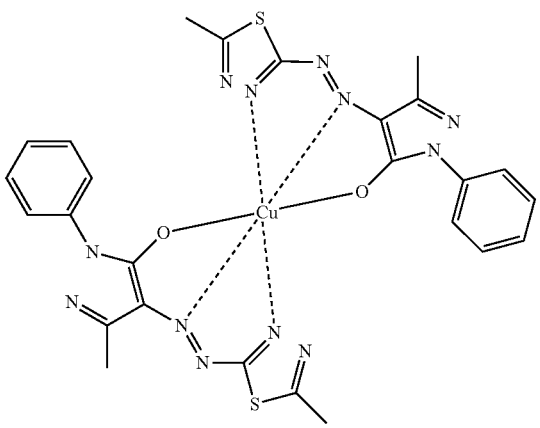

The blending ratio by mass of the azo metal complex dye and neutral dye in the recording layer is desirably azo metal complex dye:neutral dye=95:5 to 50:50. When this mass ratio is equal to or higher than 95:5, an effect can be efficiently achieved by adding the neutral dye, and at equal to or lower than 50:50, it is possible to maintain good light resistance and solution stability in the azo metal complex dye in the recording layer. This mass ratio is preferably 95:5 to 80:20, and more preferably, 95:5 to 90:10. When employing the neutral dye in combination, the content of the azo metal complex dye in the recording layer falls, for example, within a range of 50 to 95 mass percent, desirably falls within a range of 70 to 95 mass percent, preferably falls within a range of 80 to 95 mass percent, and optimally falls within a range of 90 to 95 mass percent.

It suffices for the optical information recording medium of the present invention to comprise at least one recording layer on a support (a surface having pregrooves with a track pitch of 50 to 500 nm), but two or more recording layers may be present. Further, recording layers other than the recording layer containing the azo metal complex dye may also be present. When other dyes are employed in combination as recording dyes in the recording layer containing the azo metal complex dye, the proportion of the azo metal complex dye is desirably 70 to 100 mass percent, preferably 80 to 100 mass percent of the total dye component.

When employing dyes other than the above azo metal complex dye as dye components in the present invention, these dyes preferably have absorption in the short wavelength region of equal to or shorter than 440 nm, for example. Such dyes are not specifically limited; examples are azo dyes, azo metal complex dyes, phthalocyanine dyes, oxonol dyes, cyanine dyes, and squarylium dyes.

In the optical information recording medium of the present invention, the recording layer comprising the azo metal complex dye is a layer permitting the recording of information by irradiation of a laser beam. The phrase "permitting the recording of information by irradiation of a laser beam" means that the optical characteristics of portions of the recording layer that are irradiated with a laser beam change. The change in optical characteristics is thought to occur when a laser beam is directed onto the recording layer and the irradiated portions absorb the beam, causing the temperature to rise locally and producing a physical or chemical change (such as generating a pit). Reading (reproduction) of information that has been recorded on the recording layer can be achieved by irradiating a laser beam of the same wavelength as that employed in recording, for example, and detecting the difference in optical characteristics, such as the refractive index, between portions where the optical characteristics of the recording layer have been changed (recorded portions) and portions where they have not (unrecorded portions). The above-described azo metal complex dye absorbs laser beams of equal to or shorter than 440 nm, for example. The optical information recording medium of the present invention, which comprises a recording layer comprising the metal complex compound having absorption in the short wavelength region in this manner is suitable as a large-capacity optical disk permitting recording by a short-wavelength laser, such as an optical disk of the Blu-ray type that employs a blue laser of 405 nm. The method for recording information on the optical information recording medium of the present invention will be described further below.

The optical information recording medium of the present invention comprises at least the above-described recording layer comprising the azo metal complex dye on a support, and may further comprise a light reflective layer, a protective layer, and the like in addition to the above-described recording layer.

Any of the various materials conventionally employed as support materials for optical information recording media may be selected for use as the support employed in the present invention. A transparent disk-shaped support is preferably employed as the support.

Specific examples are glass, acrylic resins such as polycarbonate and polymethyl methacrylate, vinyl chloride resins such as polyvinyl chloride and vinyl chloride copolymers, epoxy resins, amorphous polyolefins, polyesters, and metals such as aluminum. They may be employed in combination as desired.

Of the above materials, thermoplastic resins such as amorphous polyolefins and polycarbonates are preferable, and polycarbonates are particularly preferable, from the perspectives of resistance to humidity, dimensional stability, low cost, and the like. When employing these resins, the support can be manufactured by injection molding.

The thickness of the support generally falls within a range of 0.7 to 2 mm, preferably a range of 0.9 to 1.6 mm, and more preferably, within a range of 1.0 to 1.3MM.

To enhance smoothness and increase adhesive strength, an undercoating layer can be formed on the surface of the support on the side on which the light reflective layer, described further below, is positioned.

Tracking guide grooves or irregularities (pregrooves) denoting information such as address signals are formed on the surface of the support on which the recording layer is formed. The track pitch of these pregrooves falls within a range of 50 to 500 nm. When the track pitch is equal to or greater than 50 nm, not only is it possible to correctly form the pregrooves, but the generation of crosstalk can be avoided. At equal to or less than 500 nm, high-density recording is possible. A support on which a narrower track pitch than that employed in CD-Rs and DVD-Rs is formed to achieve a higher recording density is employed in the optical information recording medium of the present invention. The preferable range of the track pitch will be described in detail further below.

An optical information recording medium (referred to as "Embodiment (1)" hereinafter) sequentially comprising, from the support side, a support 0.7 to 2 mm in thickness, a dye-containing recordable recording layer, and a cover layer 0.01 to 0.5 mm in thickness is an example of a preferable embodiment of the optical information recording medium of the present invention.

In Embodiment (1), it is preferable for the pregrooves formed on the support to be 50 to 500 nm in the track pitch, 25 to 250 nm in the groove width, and 5 to 150 nm in the groove depth.

Optical information recording medium of Embodiment (1) will be described in detail below. However, the present invention is not limited to Embodiment (1).

Optical information recording medium of Embodiment (1)

The optical information recording medium of Embodiment (1) comprises at least a support, a recordable recording layer, and a cover layer. The optical information recording medium of Embodiment (1) is suitable as a Blu-ray type recording medium. In the Blu-ray system, information is recorded and reproduced by irradiation of a laser beam from the cover layer side, and a light reflective layer is normally provided between the support and the recording layer.

FIG. 1 shows an example of an optical information recording medium of Embodiment (1). The first optical information recording medium 10A shown in FIG. 1 is comprised of first light reflective layer 18, first recordable layer 14, barrier layer 20, first bonding layer or first adhesive layer 22, and cover layer 16, in that order on first support 12

These materials constituting these components will be sequentially described below.

Support

On the support of Embodiment (1) are formed pregrooves (guide grooves) having a shape such that the track pitch, groove width (half width), groove depth, and wobble amplitude all fall within the ranges given below. The pregrooves are provided to achieve a recording density greater than that of CD-Rs and DVD-Rs. For example, the optical information recording medium of the present invention is suited to use as a medium for blue-violet lasers.

The track pitch of the pregrooves ranges from 50 to 500 nm. When the track pitch is equal to or greater than 50 nm, not only is it possible to correctly form the pregrooves, but the generation of crosstalk can be avoided. At equal to or less than 500 nm, high-density recording is possible. The rack pitch of the pregrooves is preferably ranges from 100 nm to 420 nm, more preferably from 200 nm to 370 nm, and further preferably from 260 nm to 330 nm.

The groove width (half width) of the pregrooves ranges from 25 to 250 nm, preferably from 50 to 240 nm, more preferably from 80 to 230 nm, and further preferably from 100 to 220 nm. A pregroove width of equal to or higher than 25 nm can permit adequate transfer of the grooves during molding and can inhibit a rise in the error rate during recording. A groove width of equal to or lower than 250 nm can also permit adequate transfer of grooves during molding and can avoid crosstalk due to the widening of bits formed during recording.

The groove depth of the pregrooves ranges from 5 to 150 nm. Pregrooves that are equal to or greater 5 nm in depth can permit an adequate degree of recording modulation, and a depth of equal to or less than 150 nm can permit the achieving of high reflectance. The groove depth of the pregrooves preferably ranges from 10 to 85 nm, more preferably from 20 to 80 nm, and further preferably from 28 to 75 nm.

The upper limit of the groove tilt angle of the pregrooves is preferably equal to or less than 80°, more preferably equal to or less than 75°, further preferably equal to or less than 70°, and still more preferably, equal to or less than 65°. The lower limit is preferably equal to or greater than 20°, more preferably equal to or greater than 30°, and still more preferably, equal to or greater than 40°.

When the groove tilt angle of the pregrooves is equal to or greater than 20°, an adequate tracking error signal amplitude can be achieved, and at equal to or less than 80°, shaping properties are good.

Recordable Recording Layer

The recordable recording layer of Embodiment (1) can be formed by preparing a coating liquid by dissolving the dye in a suitable solvent with or without the use of a binder or the like, coating this coating liquid on the support or on a light reflective layer, described further below, to form a coating, and then drying the coating. The recordable recording layer may comprise a single layer or multiple layers. When the structure is multilayer, the step of coating the coating liquid may be conducted multiple times.

The concentration of dye in the coating liquid generally ranges from 0.01 to 15 mass percent, preferably ranges from 0.1 to 10 mass percent, more preferably ranges from 0.5 to 5 mass percent, and still more preferably, ranges from 0.5 to 3 mass percent.

Examples of the solvent employed in preparing the coating liquid are: esters such as butyl acetate, ethyl lactate, and Cellosolve acetate; ketones such as methyl ethyl ketone, cyclohexanone, and methyl isobutyl ketone; chlorinated hydrocarbons such as dichloromethane, 1,2-dichloroethane, and chloroform; amides such as dimethylformamide; hydrocarbons such as methylcyclohexane; ethers such as tetrahydrofuran, ethyl ether, and dioxane; alcohols such as ethanol, n-propanol, isopropanol, and n-butanol diacetone alcohol; fluorine solvents such as 2,2,3,3-tetrafluoro-1-propanol; and glycol ethers such as ethylene glycol monomethylether, ethylene glycol monoethylether, and propylene glycol monomethylether.

The solvents may be employed singly or in combinations of two or more in consideration of the solubility of the dyes employed. Binders, oxidation inhibitors, UV absorbing agents, plasticizers, lubricants, and various other additives may be added to the coating liquid as needed.

Examples of coating methods are spraying, spincoating, dipping, roll coating, blade coating, doctor roll coating, and screen printing.

During coating, the temperature of the coating liquid preferably falls within a range of 23 to 50° C., more preferably within a range of 24 to 40° C., and further preferably, within a range of 25 to 40° C.

The thickness of the recordable recording layer on lands (protrusions on the support) is preferably equal to or less than 300 nm, more preferably equal to or less than 250 nm, further preferably equal to or less than 200 nm, and still more preferably, equal to or less than 180 nm. The lower limit is preferably equal to or greater than 1 nm, more preferably equal to or greater than 3 nm, further preferably equal to or greater than 5 nm, and still more preferably, equal to or greater than 7 nm.

The thickness of the recordable recording layer on grooves (indentation in the support) is preferably equal to or less than 400 nm, more preferably equal to or less than 300 nm, and further preferably, equal to or less than 250 nm. The lower limit is preferably equal to or greater than 10 nm, more preferably equal to or greater than 20 nm, and further preferably, equal to or greater than 25 nm.

The ratio of the thickness of the recordable recording layer on lands to the thickness of the recordable recording layer on grooves (thickness on lands/thickness on grooves) is preferably equal to or greater than 1.0, more preferably equal to or greater than 0.13, further preferably equal to or greater than 0.15, and still more preferably, equal to or greater than 0.17. The upper limit is preferably less than 1, more preferably equal to or less than 0.9, further preferably equal to or less than 0.85. and still more preferably, equal to or less than 0.8.

Various antifading agents may be incorporated into the recordable recording layer to enhance the resistance to light of the recordable recording layer. Singlet oxygen quenchers are normally employed as the antifading agent. The single oxygen quencher can also be employed in the present invention to further enhance the resistance to light. Singlet oxygen quenchers that are described in known publications such as patent specifications may be employed.

Specific examples are described in Japanese Unexamined Patent Publication (KOKAI) Showa Nos. 58-175693, 59-81194, 60-18387, 60-19586, 60-19587, 60-35054, 60-36190, 60-36191, 60-44554, 60-44555, 60-44389, 60-44390, 60-54892, 60-47069, and 63-209995; Japanese Unexamined Patent Publication (KOKAI) Heisei No. 4-25492; Japanese Examined Patent Publication (KOKOKU) Heisei Nos. 1-38680 and 6-26028; German Patent No. 350399; and the Journal of the Japanese Chemical Society, October Issue, 1992, p. 1141, which are expressly incorporated herein by reference in their entirety.

The quantity of antifading agent in the form of the above singlet oxygen quencher or the like normally falls within a range of 0.1 to 50 mass percent, preferably falls within a range of 0.5 to 45 mass percent, more preferably falls within a range of 3 to 40 mass percent, and still more preferably, falls within a range of 5 to 25 mass percent, of the quantity of dye.

Cover Layer

The cover layer in Embodiment (1) is normally adhered through a bonding agent or adhesive onto the above-described recordable recording layer or onto a barrier layer such as that shown in FIG. 1.

The cover layer is not specifically limited, other than that it be a film of transparent material. An acrylic resin such as a polycarbonate or polymethyl methacrylate; a vinyl chloride resin such as polyvinyl chloride or a vinyl chloride copolymer; an epoxy resin; amorphous polyolefin; polyester; or cellulose triacetate is preferably employed. Of these, the use of polycarbonate or cellulose triacetate is more preferable.

The term "transparent" means having a transmittance of equal to or greater than 80 percent for the beam used in recording and reproducing.

The cover layer may further contain various additives so long as they do not compromise the effect of the present invention. For example, UV-absorbing agents may be incorporated to cut light with the wavelength of equal to or shorter than 400 nm and/or dyes may be incorporated to cut light with the wavelength of equal to or longer than 500 nm.

As for the physical surface properties of the cover layer, both the two-dimensional roughness parameter and three-dimensional roughness parameter are preferably equal to or less than 5 nm.

From the perspective of the degree of convergence of the beam employed in recording and reproducing, the birefringence of the cover layer is preferably equal to or lower than 10 nm.

The thickness of the cover layer can be suitably determined based on the NA or wavelength of the laser beam irradiated in recording and reproducing. In the present invention, the thickness preferably falls within a range of 0.01 to 0.5 mm, more preferably a range of 0.05 to 0.12 mm.

The total thickness of the cover layer and bonding or adhesive layer is preferably 0.09 to 0.11 mm, more preferably 0.095 to 0.105 mm.

A protective layer (hard coating layer 44 in the embodiment shown in FIG. 1) may be provided on the incident light surface of the cover layer during manufacturing of the optical information recording medium to prevent scratching of the incident light surface.

To bond the cover layer and the recordable recording layer or barrier layer, a bonding layer or an adhesive layer may be provided between the two layers.

A UV-curable resin, EB-curable resin, thermosetting resin, or the like is preferably employed as the bond in the bonding layer.

When employing a UV-curable resin as the bond, the UV-curable resin may be employed as is, or dissolved in a suitable solvent such as methyl ethyl ketone or ethyl acetate to prepare a coating liquid, which is then coated on the surface of the barrier layer with a dispenser. To prevent warping of the optical information recording medium that has been manufactured, a UV-curable resin having a low curing shrinkage rate is preferably employed in the bonding layer. Examples of such UV-curable resins are SD-640 and the like, made by Dainippon Ink and Chemicals, Inc.

The method of forming the bonding layer is not specifically limited. It is desirable to coat a prescribed quantity of bond on the surface of the barrier layer or the recordable layer (the bonded surface), dispose a cover layer thereover, uniformly spread the bond between the bonded surface and the cover layer by spin-coating or the like, and then cure the bond.

The thickness of the bonding layer preferably falls within a range of 0.1 to 100 micrometers, more preferably a range of 0.5 to 50 micrometers, and further preferably, 1 to 30 micrometers.

Examples of the adhesive employed in the adhesive layer are acrylic, rubber, and silicone adhesives. From the perspectives of transparency and durability, acrylic adhesives are preferable. Preferable acrylic adhesive is an acrylic adhesive comprising a main component in the form of 2-ethylhexyl acrylate, n-butyl acrylate, or the like copolymerized with a short-chain alkyl acrylate or methacrylate, such as methyl acrylate, ethyl acrylate, or methyl methacrylate to increase the cohesive force, and the component capable of becoming a crosslinking point with a crosslinking agent, such as acrylic acid, methacrylic acid, an acrylamide derivative, maleic acid, hydroxylethyl acrylate, or glycidyl acrylate. The type and blending ratio of the main component, short-chain component, and component for the addition of a crosslinking point can be suitably adjusted to vary the glass transition temperature (Tg) and crosslinking density. The glass transition temperature (Tg) preferably equal to or less than 0° C., more preferably equal to or less than −15° C., and further preferably, equal to or less than −25° C.

The glass transition temperature (Tg) can be measured by differential scanning calorimetry (DSC) with a DSC6200R made by Seiko Instruments, Inc.

The method described in Japanese Unexamined Patent Publication (KOKAI) No. 2003-217177, Japanese Unexamined Patent Publication (KOKAI) No. 2003-203387, Japanese Unexamined Patent Publication (KOKAI) Heisei No. 9-147418, which are expressly incorporated herein by reference in their entirety, or the like can be used to prepare the adhesive.

The method of forming the adhesive layer is not specifically limited. A prescribed quantity of adhesive can be uniformly coated on the surface of the barrier layer or recordable recording layer (the adhered surface), a cover layer can be disposed thereover, and the adhesive can be cured. Alternatively, a prescribed quantity of adhesive can be uniformly coated on one side of the cover layer to form a coating of adhesive, this coating can be adhered to the adhered surface, and then the adhesive can be cured.

Further, a commercial adhesive film on which an adhesive layer has been disposed in advance can be employed as the cover layer.

The thickness of the adhesive layer preferably falls within a range of 0.1 to 100 micrometers, more preferably a range of 0.5 to 50 micrometers, and further preferably, a range of 10 to 30 micrometers.

The cover layer can also be formed by spin-coating UV-curable resin.

Other Layers

The optical information recording medium of Embodiment (1) may optionally comprise other layers in addition to the above-described essential layers so long as the effect of the present invention is not compromised. Examples of such optional layers are a label layer having a desired image that is formed on the back of the support (the reverse unformed side from the side on which the recordable recording layer is formed), a light reflective layer positioned between the support and the recordable recording layer (described in detail further below), a barrier layer positioned between the recordable recording layer and the cover layer (described in detail further below), and a boundary layer positioned between the above light reflective layer and the recordable recording layer. The "label layer" may be formed from UV-curing resin, thermosetting resin, or heat-drying resin.

Each of the above-described essential layers and optional layers may have a single-layer or multilayer structure.

To increase reflectance for the laser beam and impart functions that enhance recording and reproducing characteristics to the optical information recording medium of Embodiment (1), a light reflective layer is preferably formed between the support and the recordable recording layer.

The reflective layer can be formed, for example, by vacuum vapor depositing, by sputtering, or by ion plating a light reflective substance with high reflectance for the laser beam on the support. The thickness of the light reflective layer can normally range from 10 to 300 nm, preferably ranges from 30 to 200 nm.

The reflectance is preferably equal to or greater than 70 percent.

Examples of light reflective substances of high reflectance are: metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi; and stainless steel. These light reflective substances may be employed singly, in combinations of two or more, or as alloys. Of these, the preferable substances are: Cr, Ni, Pt, Cu, Ag, Au, Al, and stainless steel; the more preferable substances are: Au, Ag, Al, and their alloys; and the substances of greatest preference are: Au, Ag, and their alloys.

Barrier Layer

In the optical information recording medium of Embodiment (1), as shown in FIG. 1, it is preferable to form a barrier layer between the recordable recording layer and the cover layer.

The barrier layer can be provided to enhance the storage properties of the recordable recording layer, enhance adhesion between the recordable recording layer and cover layer, adjust the reflectance, adjust thermal conductivity, and the like.

The material employed in the barrier layer is a material that passes the beam employed in recording and reproducing; it is not specifically limited beyond being able to perform this function. For example, it is generally desirable to employ a material with low permeability to gas and moisture. A material that is also a dielectric is preferred.

Specifically, materials in the form of nitrides, oxides, carbides, and sulfides of Zn, Si, Ti, Te, Sn, Mo, Ge, Nb, Ta and the like are preferable. $MoO_2$, $GeO_2$, $TeO$, $SiO_2$, $TiO_2$, $ZuO$, $SnO_2$, $ZnO$—$Ga_2O_3$, $Nb_2O_5$, and $Ta_2O_5$ are preferable and $SnO_2$, $ZnO$—$Ga_2O_3$, $SiO_2$, $Nb_2O_5$, and $Ta_2O_5$ are more preferable.

The barrier layer can be formed by vacuum film-forming methods such as vacuum vapor deposition, DC sputtering, RF sputtering, and ion plating. Of these, sputtering is preferred.

The thickness of the barrier layer preferably falls within a range of 1 to 200 nm, more preferably within a range of 2 to 100 nm, and further preferably, within a range of 3 to 50 nm.

Method of Recording Information

The present invention relates to a method of recording information on the recording layer comprised in the optical information recording medium of the present invention by irradiation of a laser beam having a wavelength of equal to or shorter than 440 nm onto the optical information recording medium.

By way of example, information is recorded on the above-described preferred optical information recording medium of Embodiment (1) in the following manner.

First, while rotating an optical information recording medium at a certain linear speed (such as 0.5 to 10 m/s) or a certain angular speed, a laser beam for recording, such as a semiconductor laser beam, is directed from the protective layer side. Irradiation by this laser beam changes the optical properties of the portions that are irradiated, thereby recording information. In the embodiment shown in FIG. 1, recording laser beam 46 such as a semiconductor laser beam is directed from cover layer 16 side through first object lens 42 (having a numerical aperture NA of 0.85, for example). Irradiation by laser beam 46 causes recordable recording layer 14 to absorb laser beam 46, resulting in a local rise in temperature. This is thought to produce a physical or chemical change (such as generating pits), thereby altering the optical characteristics and recording information.

In the method of recording information of the present invention, information is recorded by irradiation of a laser beam having a wavelength of equal to or shorter than 440 nm. A semiconductor laser beam having an oscillation wavelength falling within a range of equal to or shorter than 440 nm is suitable for use as a recording beam. A blue-violet semiconductor laser beam having an oscillation wavelength falling within a range of 390 to 415 nm and a blue-violet SHG laser beam having a core oscillation wavelength of 425 nm obtained by halving the wavelength of an infrared semiconductor laser beam having a core oscillation wavelength of 850 nm with an optical waveguide device are examples of preferable light sources. In particular, a blue-violet semiconductor laser beam having an oscillation wavelength of 390 to 415 nm is preferably employed from the perspective of recording density. The optical information recording medium has the reflective layer between the support and the recordable recording layer, and a laser beam is irradiated onto the recording layer from the cover layer side, that is, the surface side opposite from the surface facing the reflective layer.

The information that is thus recorded can be reproduced by directing the semiconductor laser beam from the support side or protective layer side while rotating the optical information recording medium at the same constant linear speed as in the recording, and detecting the reflected beam.

Azo Metal Complex Dye

The present invention further relates to the azo metal complex dye denoted by general formula (C) described above.

The azo metal complex dye of the present invention can be employed in various uses, such as colorants, photographic materials, UV-absorbing materials, color filter dyes, color-changing filters, and conductive films. The azo metal complex dye is preferably employed as a dye for recording layer in optical recording media having a dye-containing recording layer. The details of the azo metal complex dye and the method for manufacturing the same are as set forth above.

EXAMPLES

The present invention will be described more specifically below based on examples. However, the present invention is not limited to the examples.

Specific examples of methods of synthesizing the azo dye denoted by general formula (1) are given below. However, the present invention is not limited to these methods.

[Synthesis of Compound (L-11)]

[Chem. 31]

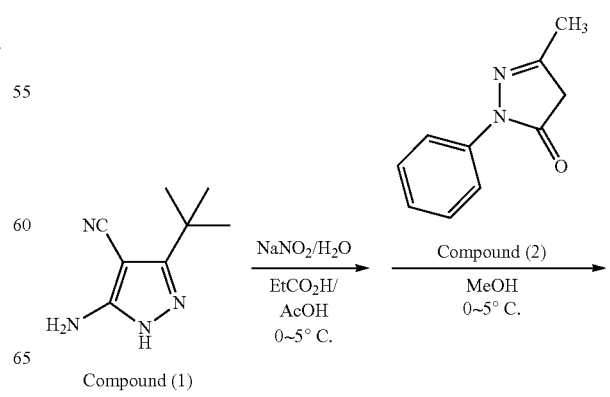

Compound (1)

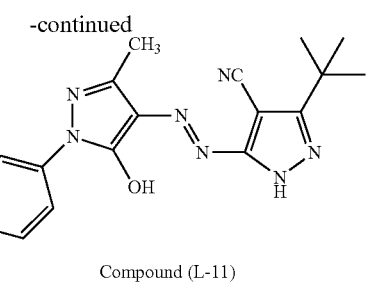

Compound (L-11)

Into a three-liter, three-necked flask were poured 100 g of compound (1), 120 mL of acetic acid, and 180 mL of propionic acid. With ice cooling, 185 mL of hydrochloric acid (35 to 37 percent) was gradually added dropwise. The mixture was cooled to −5 to 5° C. in an ice bath. To this was gradually added dropwise 80 mL of an aqueous solution containing 42 g of dissolved $NaNO_2$, after which the mixture was stirred for 30 minutes at 0 to 5° C. This acidic solution was gradually added to 500 mL of a methanol solution containing 106.1 g of compound (2) which had been maintained with ice cooling at 0 to 5° C., and the mixture was stirred for one hour at 0 to 10° C. The mixture was returned to room temperature. The precipitate was filtered out, washed with 250 mL of methanol, and then washed with 600 mL of distilled water. The solid obtained was dispersed in ethanol and the mixture was stirred for one hour at 60° C. The crystals were filtered out, washed with methanol, and dried, yielding 140 g of compound (L-11). The compound was identified by 300 MHz $^1$H-NMR.

$^1$H-NMR(DMSO-d6)[ppm]; δ13.33(1H,br),7.88(2H,d), 7.47(2H,t),7.25(1H,t),2.26(3H,s),1.42(9H,s)

(L-1) to (L-10) and (L-12) to (L-22) were synthesized by the same method used to synthesize compound (L-11) above. Various azo dyes that can be employed in the present invention can be similarly synthesized. The compounds were identified by 300 MHz $^1$H-NMR.

Next, specific examples will be given of methods of synthesizing the azo metal complex dye denoted by Example compound (M-11). However, the present invention is not limited to these methods.

[Synthesis of (M-11)]

To a three-liter, three-necked flask were charged 120 g of compound (L-11) and 1,200 mL of methanol. While stirring, 193 mL of diisopropylamine was added dropwise. Following complete dissolution, 82.3 g of copper acetate monohydrate was added while stirring, and the mixture was maintained for two hours at 60 to 65° C. The mixture was returned to room temperature. The precipitate was filtered out, washed with methanol, and dried, yielding 117 g of compound (M-11). The compound was identified by measuring the content of Cu by ICP-OES and conducting ESI-TOF-MS and X-ray structural analysis.

ESI-TOF-MS: m/z=2556 (negative), 1279 (negative).

ICP-OES: Cu content=168±4 g/kg

In X-ray structural analysis, the product was confirmed to be the polynuclear copper complex indicated below comprised of six azo dyes and seven copper ions. The results of ESI-TOF-MS were consistent with the following structure.

[Chem. 32]

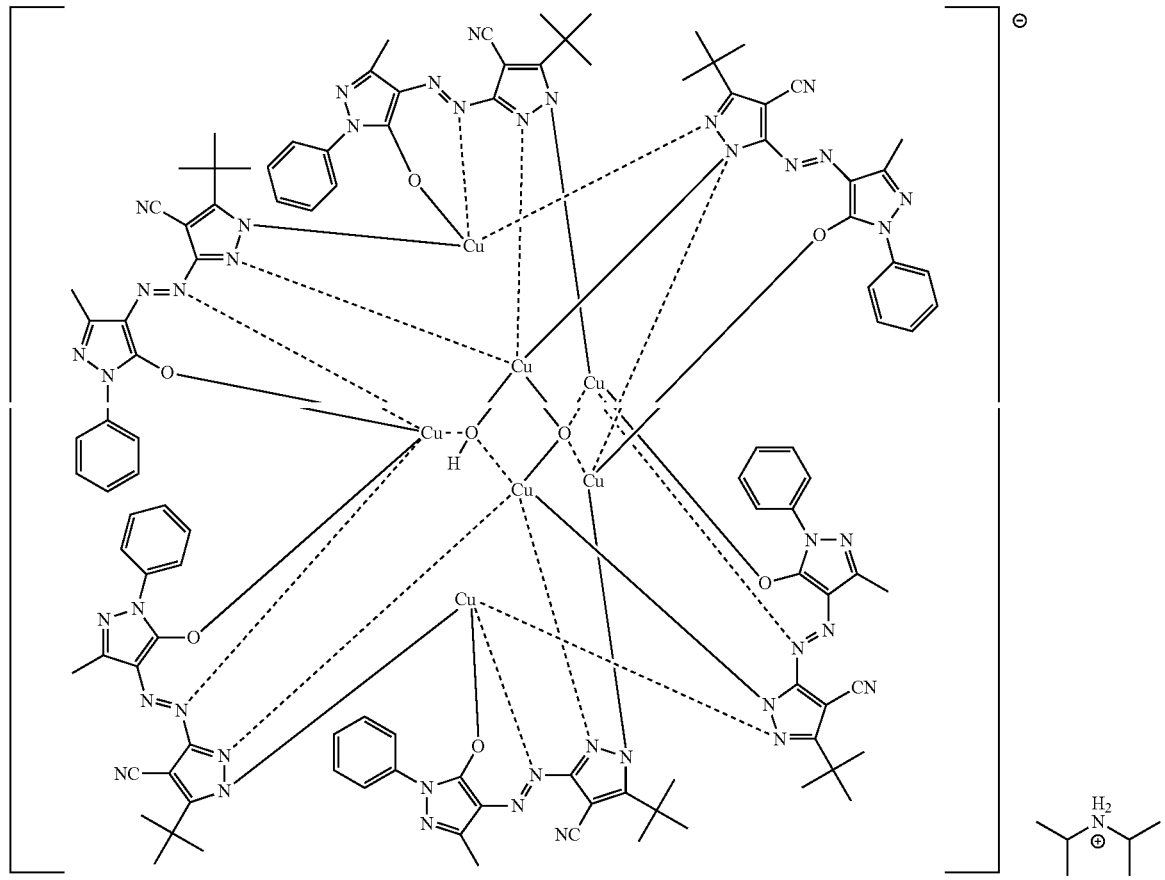

(M-1), (M-12) to (M-14), (M-21) to (M-26), (M-28), and (M-41) to (M-54) were synthesized using the same manufacturing method (at various different reaction scales) as for (M-11) with different starting materials and equivalence ratios. The compounds were identified by ESI-TOF-MS and confirmed by ICP-OES, X-ray structural analysis, HPLC, GC, or the like.

Various azo metal complex dyes that can be employed in the optical information recording medium of the present invention can be synthesized by the same synthesis methods as the above compounds. The compounds can be identified by MALDI-TOF-MS, ESI-TOF-MS, ICP-OES, X-ray structural analysis, HPCL, GC, and the like. The method of measurement by ICP-OES will be described below.

<<Measurement by ICP-OES (ICP Emission Spectroscopy)>>

A 0.05 g sample was collected, 3 mL of nitric acid was added, and microwave ashing was conducted. The ash was mixed with 100 mL of water and Cu was quantified using the absolute analytic curve method by ICP-OES (with a 1000-IV made by Shimadzu Corporation).

Examples 1 to 18

<<Preparation of Optical Information Recording Medium>>
(Preparation of Support)

An injection molded support comprised of polycarbonate resin and having a thickness of 1.1 mm, an outer diameter of 120 mm, an inner diameter of 15 mm, and spiral pregrooves (with a track pitch of 320 nm, a groove width (at concave portion) of 190 nm, a groove depth of 47 nm, a groove tilt angle of 52°, and a wobble amplitude of 20 nm) was prepared. Mastering of the stamper employed during injection-molding was conducted by laser beam (351 nm) cutting.

(Formation of Light Reflective Layer)

An ANC (Ag: 98.1 at %, Nd: 0.7 at %, Cu: 0.9 at %) light reflective layer 60 nm in thickness was formed on the support as a vacuum-formed film layer by DC sputtering in an Ar atmosphere using a Cube manufactured by Unaxis Corp. The thickness of the light reflective film was adjusted by means of the duration of sputtering.

(Formation of Recordable Recording Layer)

7 g of each of Example compounds shown in Table 3 was separately added to and dissolved in 100 mL of 2,2,3,3-tetrafluoropropanol and dye-containing coating liquids were prepared as Examples 1 to 18. The dye-containing coating liquids that had been prepared were then coated on a first reflective layer by spin coating while varying the rotational speed from 500 to 2,200 rpm under conditions of 23° C. and 50 percent RH to form a first recordable recording layer.

After forming the recordable recording layer, annealing was conducted in a clean oven. In the annealing process, the supports were supported while creating a gap with spacers in the vertical stack pole and maintained for 1 hour at 80° C.

(Formation of Barrier Layer)

Subsequently, a Cube made by Unaxis Corp. was employed to form by DC sputtering in an argon atmosphere a barrier layer comprised of $Nb_2O_5$ having a thickness of 10 nm on the recordable recording layer.

(Adhesion of a Cover Layer)

A cover layer in the form of a polycarbonate film (Teijin Pureace, 80 micrometers in thickness) measuring 15 mm in inner diameter, 120 mm in outer diameter, and having an adhesive layer (with a glass transition temperature of −52° C.) on one side was provided so that the combined thickness of the adhesive layer and the polycarbonate film was 100 micrometers.

After placing the cover layer on the barrier layer through the adhesive layer, a member was placed against the cover layer and pressure was applied, bonding the cover layer and barrier layer. This process yielded optical information recording media of Examples 1 to 12 having a light reflective layer, a recordable recording layer, a barrier layer, an adhesive layer, and a cover layer in this order on a support.

<Measurement of the Film Thickness of the Dye Layer>

Cross-sections of the optical information recording media obtained were viewed by SEM and the thickness of the dye layer respectively at the groove concave portion and the groove convex portion were read. The groove concave portion of the dye layer was +0 to 10 nm in depth, and the groove convex portion of the dye layer was about 10 to 30 nm.

Comparative Examples 1 to 7

<<Preparation of Optical Information Recording Medium>>

With the exception that comparative compounds (A) to (G) were employed in place of Example compound as dyes in the recordable recording layer, the optical information recording media of Comparative Examples 1 to 9 were prepared by the same method as in Examples.

[Chem. 33]

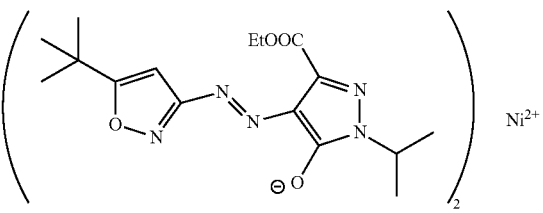

Comparative compound (A): compound described in Japanese Unexamined Patent Publication (KOKAI) No. 2001-158862

[Chem. 34]

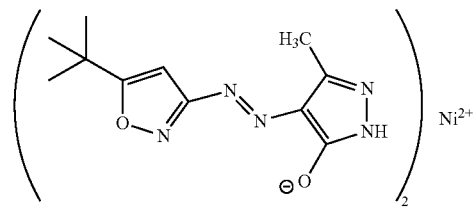

Comparative compound (B): compound described in Japanese Unexamined Patent Publication (KOKAI) No. 2001-158862

[Chem. 35]

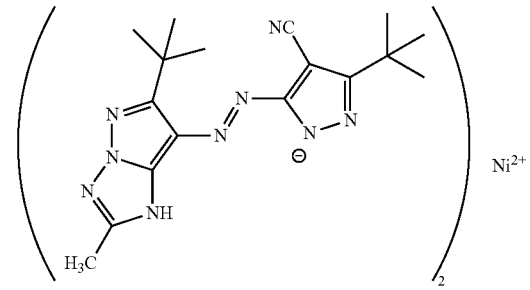

Comparative compound (C): compound within the scope described in Japanese Unexamined Patent Publication (KOKAI) No. 2006-142789

-continued

[Chem. 36]

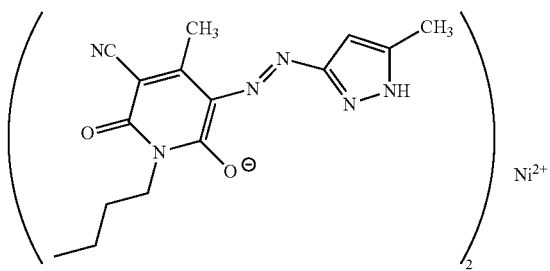

Comparative compound (D): compound described in Japanese Unexamined Patent Publication (KOKAI) No. 2006-306070

[Chem. 37]

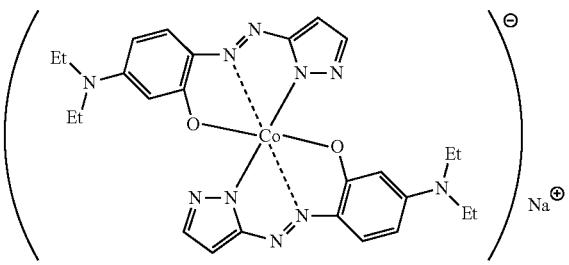

Comparative compound (E): compound described in Japanese Unexamined Patent Publication (KOKAI) No. 2000-168237

[Chem. 38]

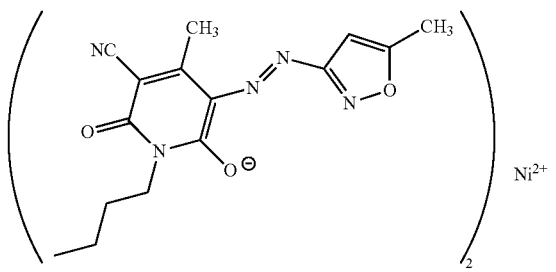

Comparative compound (F): compound described in Japanese Unexamined Patent Publication (KOKAI) No. 2006-306070

[Chem. 39]

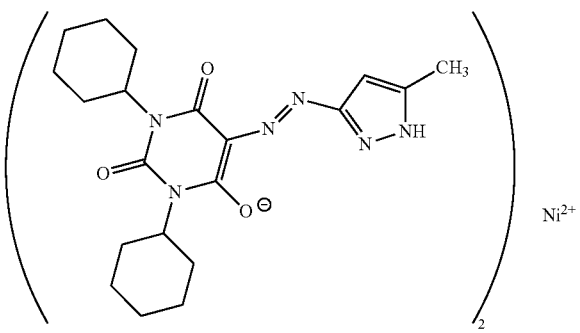

Comparative compound (G): compound described in Japanese Unexamined Patent Publication (KOKAI) No. 2007-45147

<Evaluation of the Optical Information Recording Medium>

(1) Jitter Evaluation

A (1.7) RLL-NRZI modulated mark-length modulated signal (17 PP) was recorded at a clock frequency of 66 MHz and a linear speed of 4.92 m/s by irradiation from the cover layer side with a recording and reproduction evaluation device (made by Pulstec Industrial Co., Ltd.: DDU 1000) comprising a 405 nm laser and NA 0.85 pick-ups on the optical information recording medium that had been prepared. Jitter measurement was conducted by passing the recorded signal through a limit equalizer and employing a time interval analyzer (TA520 made by Yokogawa Electric Corporation).

(2) Evaluation of the Light Resistance of the Dye Film

Dye-containing coating liquids identical to Examples 1 to 18 and Comparative Examples 1 to 7 were prepared and applied at an ordinary temperature under a nitrogen atmosphere to glass sheets 1.1 mm in thickness by spincoating while varying the rotational speed from 500 to 1,000 rpm. Subsequently, the glass sheets were maintained for 24 hours at an ordinary temperature. A merry-go-round shaped light resistance tester (Cell Tester III, made by Eagle Engineering, Inc., with WG320 filter made by Schott) was then used to conduct a light resistance test. The absorption spectra of the dye film immediately prior to the light resistance test and 48 hours after the light resistance test were measured with a UV-1600PC (made by Shimadzu Corp.). The change in absorbance at the maximum absorption wavelength was read.

TABLE 3

| | | Azo metal complex dye | Light resistance of dye film[Note 1] | Recording and reproduction characteristics[Note 2] |
|---|---|---|---|---|
| Present invention | Ex. 1 | (M-1) | ◉ | ◉ |
| | Ex. 2 | (M-11) | ◉ | ◉ |
| | Ex. 3 | (M-12) | ◉ | ◉ |
| | Ex. 4 | (M-13) | ◉ | ◉ |
| | Ex. 5 | (M-14) | ◉ | ◉ |
| | Ex. 6 | (M-21) | ◉ | ◉ |
| | Ex. 7 | (M-22) | ◉ | ◉ |
| | Ex. 8 | (M-24) | ◉ | ◉ |
| | Ex. 9 | (M-25) | ◉ | ◉ |
| | Ex. 10 | (M-26) | ◉ | ◉ |
| | Ex. 11 | (M-28) | ◉ | ◉ |
| | Ex. 12 | (M-41) | ◉ | ◉ |
| | Ex. 13 | (M-42) | ◉ | ◉ |
| | Ex. 14 | (M-43) | ◉ | ◉ |
| | Ex. 15 | (M-44) | ◉ | ◉ |
| | Ex. 16 | (M-45) | ◉ | ◉ |
| | Ex. 17 | (M-53) | ◉ | ◉ |
| | Ex. 18 | (M-54) | ◉ | ◉ |
| Comp. Ex. | Comp. Ex. 1 | Compound (A) | Δ | X |
| | Comp. Ex. 2 | Compound (B) | X | X[Note 3] |
| | Comp. Ex. 3 | Compound (C) | Δ | X |
| | Comp. Ex. 4 | Compound (D) | — (Undissolved) | X[Note 3] |
| | Comp. Ex. 5 | Compound (E) | Δ | X |
| | Comp. Ex. 6 | Compound (F) | X | ○ |
| | Comp. Ex. 7 | Compound (G) | Δ | X |

[Note 1] After 48 hours of irradiation by Xe lamp, a dye remaining rate at absorption λmax of equal to or greater than 90 percent was denoted by ◉, equal to or greater than 85 percent but less than 90 percent by ○, equal to or greater than 75 percent but less than 85 percent by Δ, and less than 75 percent by X.
[Note 2] A jitter of less than 7 percent was denoted by ◉, equal to or greater than 7 percent but less than 8 percent by ○, and equal to or greater than 8 percent by X.
[Note 3] Due to poor solubility and the inability to form an adequate recording layer, recording or measurement was precluded.

As shown in Table 3, in contrast to Comparative Examples 1 to 7, in which conventional azo metal complexes were employed, all of Examples 1 to 18 exhibited both light resistance and recording and reproduction characteristics, and had good characteristics as dyes in Blu-ray discs. Compared to the dyes containing Ni ions and Co ions that have been desirably employed as metal ions thus far in azo metal complexes, the azo metal complex dye of the present invention containing Cu ions exhibited better light resistance and better recording and reproduction characteristics. In all of Examples, recording and reproduction of the optical information recording medium was possible after 55 hours of irradiation with a Xe lamp, and light resistance was good in the optical information recording medium.

The azo metal complex dyes employed in Examples exhibited good solubility in coating solvents and good storage stability in solution. The optical information recording medium prepared in Example 1 was stored for 168 hours at high temperature and high humidity following recording, but almost no jitter change was observed. This indicated extremely good storage stability at high temperature and high humidity.

When an optical information recording medium was formed by the same method with the exception that a bonding layer (UV-curable resin) was employed instead of an adhesive layer to bond the cover layer in the above Examples, extremely good recording and reproduction characteristics, light resistance, and storage stability were observed in the same manner as in the above Examples.

When a powder of compound (M-11) was stored for three months at 60° C. in air, no change in physical properties was observed, indicating extremely good thermal stability.

Examples 19 to 24

(1) Formation of Complex Salt

To a 100 mL flask were charged 40 g of (M-11), 7.24 g of (Cat-2) comprising counter anions in the form of p-toluene sulfonic acid ions, and 600 mL of methanol. The mixture was stirred for two hours at room temperature. The precipitate obtained was separated by filtration, washed with MeOH, and dried, yielding 43 g of (M-102), the compound denoted by general formula (C). The complex obtained was identified by ESI-TOF-MS, MALDI-MS, and HPLC. The fact that the complex obtained substantially no diisopropylammonium or p-toluenesulfonic acid ions was confirmed by HPLC and GC. The complex salt obtained can be determined to contain (An-1) and (Cat-2) as structural components based on the results of the HPLC and GC analysis.

(M-101) and (M-103) to (M-112) were synthesized in the same manner as (M-102). The compounds obtained were identified and the fact that complexes containing the anion and cation combinations shown in Table 4 below had been obtained was confirmed by ESI-TOF-MS, MALDI-MS, and HPLC.

TABLE 4

| Complex | Azo metal complex anion | Dye cation | n in general formula (C) |
|---|---|---|---|
| M-101 | An-1 | Cat-1 | 1 |
| M-102 | An-1 | Cat-2 | 1 |
| M-103 | An-1 | Cat-3 | 1 |
| M-104 | An-1 | Cat-4 | 2 |
| M-105 | An-1 | Cat-5 | 1 |
| M-106 | An-1 | Cat-6 | 1 |
| M-107 | An-2 | Cat-1 | 1 |
| M-108 | An-2 | Cat-2 | 1 |
| M-109 | An-2 | Cat-3 | 1 |
| M-110 | An-2 | Cat-4 | 2 |
| M-111 | An-2 | Cat-5 | 1 |
| M-112 | An-2 | Cat-6 | 1 |

[Chem. 40]

An-1   $[Cu_7L_6(O)(OH)]$

L =

An-2   $[Cu_7L_6(O)(OH)]$

L =

[Chem. 41]

Cat-1

Cat-2

Cat-3

Cat-4

Cat-5

Cat-6

(2) Preparation of Optical Information Recording Media

With the exception that 0.7 g of the complexes prepared in (1) above were employed as the recording layer dyes, optical information recording media were prepared by the same methods as in Examples 1 to 18.

(3) Formation of Dye Film and Evaluation of Physical Characteristics (i) Measurement of Extinction Coefficient k Dye-containing coating liquid were prepared by dissolving 10 mg of each of (M-11) and (M-101) to (M-106) prepared by the above method in 2,2,3,3-tetrafluoropropanol. The dye-containing coating liquids that had been prepared were then coated on glass sheets 1.1 mm in thickness by spin coating while varying the rotational speed from 500 to 1,000 rpm at an ambient temperature in a nitrogen atmosphere to form dye films. The extinction coefficient k of each of the dye films was measured at a wavelength of 405 nm by spectral ellipsometry.

Extinction coefficient k is an intrinsic parameter of a material that depends on the wavelength $\lambda$ of light. It is defined by the following equation using the complex index of refraction N, the refractive index n, and an imaginary number unit i.

$$N = n - ik$$

In the above equation, k satisfies the following relation with absorption coefficient $\alpha$ and light wavelength $\lambda$:

$$\alpha = 4\pi k/\lambda$$

That is, the absorption coefficient a of a material at a given wavelength is proportional to k. Accordingly, increasing k increases the absorbance, causing light to be efficiently absorbed. Optical recording exploits decomposition of the dye when the recording layer dye is excited by light absorption, with light being converted to heat. Accordingly, achieving efficient light absorption promotes the decomposition process, and can be anticipated to increase recording sensitivity. High sensitivity permits high-speed recording, and is a topic that must be effective addressed in the next generation of optical recording media. One method of achieving this is to employ a material with a high k in the optical recording dye layer.

(ii) Evaluation of the Light Resistance of the Dye Film

After the dye films prepared by the same method as in (i) above, were stored for 24 hours at an ambient temperature, a merry-go-round shaped light resistance tester (Cell Tester III, made by Eagle Engineering, Inc., with WG320 filter made by Schott) was used to conduct a light resistance test. The absorption spectra of the dye film immediately prior to the light resistance test and 48 hours after the light resistance test were measured with a UV-1600PC (made by Shimadzu Corp.). The change in absorbance at the maximum absorption wavelength was read.

(iii) Evaluation of Solution Stability

Each of the complexes was added and dissolved in 2,2,3,3-tetrafluoropropanol, and the concentration is adjusted to yield an absorbance of 0.9 to 1.1. Absorption spectra of these solutions immediately prior to preparation of the solution and after storage for 48 hours were measured. The dye remaining rate was measured from the change in absorbance.

The results of the above are given in Table 5 below.

TABLE 5

| | Complex dye | Polynuclear azo metal complex dye | Cationic dye | k @405 nm | Solution stability (Note 4) | Light resistance (Note 5) |
|---|---|---|---|---|---|---|
| Ex. 19 | M-101 | An-1 | Cat-1 | 0.47 | ◉ | ◉ |
| Ex. 20 | M-102 | An-1 | Cat-2 | 0.47 | ◉ | ◉ |
| Ex. 21 | M-103 | An-1 | Cat-3 | 0.57 | ◉ | ◉ |
| Ex. 22 | M-104 | An-1 | Cat-4 | 0.52 | ○ | ○ |
| Ex. 23 | M-105 | An-1 | Cat-5 | 0.48 | ◉ | ○ |
| Ex. 24 | M-106 | An-1 | Cat-6 | 0.46 | ◉ | ○ |

(Note 4) An absorbance at absorption $\lambda$max of equal to or greater than 95% and a change in wavelength at $\lambda$max of less than ±3 nm was denoted by ◉, an absorbance at absorption $\lambda$max of equal to or greater than 90% but less than 95% and a change in wavelength at $\lambda$max of less than ±3 nm was denoted by ○, and an absorbance at absorption $\lambda$max of less than 90% or a change in wavelength at $\lambda$max of equal to or greater than ±3 nm was denoted by X.
(Note 5) After 48 hours of irradiation by Xe lamp, a dye remaining rate at absorption $\lambda$max of equal to or greater than 90 percent was denoted by ◉, equal to or greater than 80 percent but less than 90 percent by ○, equal to or greater than 70 percent but less than 80 percent by △, and less than 70 percent by X.

Evaluation Results

The extinction coefficient k of the dye film containing (M-11) was 0.40. By contrast, (M-101) to (M-106) exhibited higher extinction coefficients k than (M-11) alone. Based on these results, it can be determined that the recording sensitivity can be enhanced in Examples 19 to 24 relative to when the recording layer was prepared with just (M-11). In Examples 19 to 24, recording pits equivalent to those when (M-11) alone was employed could be formed at low-power laser output.

Examples 25 to 37

(1) Synthesis and Identification of Neutral Dyes

The neutral dyes indicated in Table 6 were synthesized according to the methods described in Japanese Unexamined Patent Publication (KOKAI) Nos. 2006-306070 and 2007-45147 as indicated below.

(2) Preparation of Optical Information Recording Media

With the exceptions that the neutral dyes indicated in Table 6 were added (see Table 6 for the quantities added) to the recording layers in addition to Example compound M-11 or M-12, optical information recording media were prepared by the same methods as in Examples 1 to 18.

Formation of Dye Film and Evaluation of Physical Characteristics

TABLE 6

| | Azo metal complex dye | Neutral dye | Blending ratio azo metal complex:neutral dye (based on mass) |
|---|---|---|---|
| Ex. 25 | M-11 | S-1 | 8:2 |
| Ex. 26 | M-11 | S-5 | 8:2 |
| Ex. 27 | M-11 | S-6 | 8:2 |
| Ex. 28 | M-11 | S-9 | 8:2 |
| Ex. 29 | M-11 | S-14 | 8:2 |
| Ex. 30 | M-11 | S-18 | 8:2 |
| Ex. 31 | M-11 | S-24 | 8:2 |
| Ex. 32 | M-11 | S-25 | 8:2 |
| Ex. 33 | M-11 | S-26 | 8:2 |
| Ex. 34 | M-12 | S-1 | 8:2 |
| Ex. 35 | M-12 | S-5 | 8:2 |
| Ex. 36 | M-12 | S-6 | 8:2 |
| Ex. 37 | M-12 | S-9 | 8:2 |

Evaluation Results

Dye-containing coating liquids identical to those in Examples 25 to 37 were prepared. The dye-containing coating liquids that had been prepared were spin coated under a nitrogen atmosphere at an ambient temperature while varying the rotational speed from 500 to 1,000 rpm. Following storage for 24 hours at an ambient temperature, a merry-go-round shaped light resistance tester (Cell Tester III, made by Eagle Engineering, Inc., with WG320 filter made by Schott) was used to test light resistance. A UV-1600 PC (made by Shimadzu Corp.) was employed to measure the absorption spectra and read the change in absorbance at the maximum absorption wavelength of the dye film just prior to light resistance testing and 48 hours after light resistance testing. In each of the mixed systems, the dye remaining rate at absorption λmax following 48 hours of irradiation by Xe lamp was equal to or higher than 85 percent, indicating good light resistance. The neutral dye (S-1) employed in Example 25 was above-described comparative compound (F). Its combined use with the azo metal complex dye was confirmed to produce clearly better light resistance than when the neutral dye alone was employed. In Example 25, measurement by the above-described method of the extinction coefficient k of the dye film obtained by the above-described method at a wavelength of 405 nm revealed an extinction coefficient k of 0.43. This indicated that the extinction coefficient of the dye film increased relative to when (M-11) was employed alone, contributing to increased recording sensitivity of the optical information recording medium. Similar measurement of the extinction coefficient k in Examples 26 to 37 confirmed that the extinction coefficient of the dye film increased relative to when (M-11) was employed alone.

The optical information recording medium and azo metal complex dye according to the present invention are not limited to the above-described modes of implementation; various configurational modification is possible without departing from the scope or spirit of the present invention. It was revealed that the azo metal complex dyes according to the present invention had desirable properties for various uses such as photographic materials, color filter dyes, color-changing filters, conductive films, thermal transfer recording materials, ink, and the like because they are excellent in light resistance and stability at high temperature and high humidity.

The use of the azo metal complex dye of the present invention as a recording layer dye permits the manufacturing of an optical information recording medium of good recording and reproduction characteristics as well as extremely high light resistance (particularly an optical information recording medium permitting recording of information by irradiation with a laser beam with a wavelength of equal to or shorter than 440 nm).

The azo metal complex dye of the present invention can also be applied to photographic materials, color filter dyes, color-changing filters, thermal transfer recording materials, ink, and the like.

EXPLANATIONS OF SYMBOLS

| | |
|---|---|
| 10A | First optical information recording medium |
| 12 | First support |
| 14 | First recordable recording layer |
| 16 | Cover layer |
| 18 | First light reflective layer |
| 20 | Barrier layer |
| 22 | First bonding layer or first adhesive layer |
| 38 | Land |
| 40 | Groove |
| 42 | First objective lens |
| 44 | Hard coat layer |
| 46 | Laser beam |

The invention claimed is:

1. An optical information recording medium comprising a recording layer on a surface of a support, wherein the surface of the support has pregrooves with a track pitch ranging from 50 to 500 nm, the recording layer comprises an azo metal complex dye, and the azo metal complex dye is a complex of six azo dyes and seven transition metal ions, wherein the multiple transition metal ions contained in a single molecule of the azo metal complex dye may be mutually identical or different, and the multiple azo dyes contained in a single molecule of the azo metal complex dye may be mutually identical or different.

2. The optical information recording medium according to claim 1, wherein the azo dye is an azo dye comprising a partial structure denoted by general formula (A) below:

General formula (A)

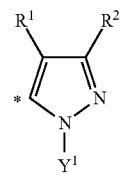

wherein, in general formula (A), $R^1$ and $R^2$ each independently denote a hydrogen atom or a substituent, $Y^1$ denotes a hydrogen atom that may dissociate during formation of the azo metal complex dye, and * denotes a binding position with —N=N— group.

3. The optical information recording medium according to claim 2, wherein the azo dye is an azo dye denoted by general formula (1) below:

General formula (1)

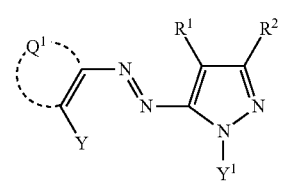

wherein, in general formula (1), $Q^1$ denotes an atom group forming a heterocyclic ring or a carbon ring with two adjacent carbon atoms, Y denotes a group comprising a hydrogen atom that may dissociate during formation of the azo metal complex dye, and $R^1$, $R^2$, and $Y^1$ are defined respectively as in general formula (A).

4. The optical information recording medium according to claim 3, wherein the following partial structure:

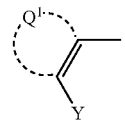

in general formula (1) is a partial structure denoted by general formula (B) below:

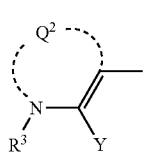

General formula (B)

wherein, in general formula (B), Y is defined as in general formula (1), $Q^2$ denotes an atom group forming a nitrogen-containing hetero ring with an adjacent nitrogen atom, an adjacent carbon atom and a carbon atom bonded to the group denoted by Y, and $R^3$ denotes an aryl group or a heteroaryl group.

5. The optical information recording medium according to claim 4, wherein the azo dye is an azo dye denoted by general formula (2) below:

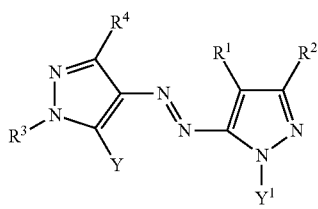

General formula (2)

wherein, in general formula (2), $R^1$, $R^2$, $Y^1$ and Y are defined respectively as in general formula (1), $R^3$ is defined as in general formula (B), and $R^4$ denotes a hydrogen atom or a substituent.

6. The optical information recording medium according to claim 3, wherein the azo metal complex dye is an azo metal complex dye denoted by general formula (C) below:

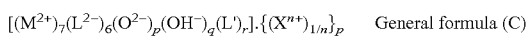

General formula (C)

wherein, in general formula (C), $M^{2+}$ denotes a divalent transition metal ion, $L^{2-}$ denotes a divalent anion that is the azo dye denoted by general formula (1) from which two hydrogen atoms have dissociated, each of p and q denotes an integer ranging from 0 to 2, with p+q=2, $X^{n+}$ denotes a cation of valence n, with n denoting an integer ranging from 1 to 10, L' denotes a ligand, and r denotes an integer ranging from 0 to 5.

7. The optical information recording medium according to claim 6, wherein, in general formula (C), $X^{n+}$ denotes an ammonium ion.

8. The optical information recording medium according to claim 1, wherein the transition metal ion is a copper ion.

9. The optical information recording medium according to claim 1, wherein the azo metal complex dye is an azo metal complex dye comprising $O^{2-}$ and/or $OH^-$.

10. The optical information recording medium according to claim 1, wherein the recording layer comprises a base, the base including protonated bases.

11. The optical information recording medium according to claim 1, wherein the recording layer comprises a cationic dye having absorption at a wavelength of 405 nm.

12. The optical information recording medium according to claim 11, wherein the recording layer comprises a complex salt of the azo metal complex dye and the cationic dye.

13. The optical information recording medium according to claim 11, wherein a cationic dye moiety contained in the cationic dye is denoted by any of general formulas (D) to (F) below:

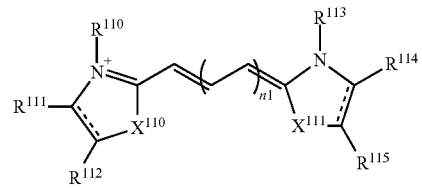

General formula (D)

wherein, in general formula (D), each of $R^{110}$, $R^{111}$, $R^{112}$, $R^{113}$, $R^{114}$, and $R^{115}$ independently denotes a hydrogen atom or a substituent, $R^{111}$ and $R^{112}$ may bond together to form a ring structure, $R^{114}$ and $R^{115}$ may bond together to form a ring structure, each of $X^{110}$ and $X^{111}$ independently denotes a carbon atom, oxygen atom, nitrogen atom, or sulfur atom, and n1 denotes an integer of equal to or greater than 0:

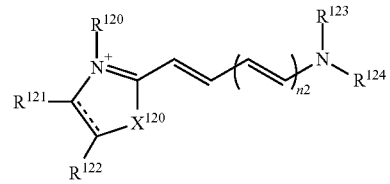

General formula (E)

wherein, in general formula (E), each of $R^{120}$, $R^{121}$, and $R^{122}$ independently denotes a hydrogen atom or a substituent, $R^{121}$ and $R^{122}$ may bond together to form a ring structure, each of $R^{123}$ and $R^{124}$ independently denotes a substituent and may bond together to form a ring structure, $X^{120}$ independently denotes a carbon atom, oxygen atom, nitrogen atom, or sulfur atom, and n2 denotes an integer of equal to or greater than 0:

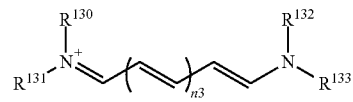

General formula (F)

wherein, in general formula (F), each of $R^{130}$, $R^{131}$, $R^{132}$, and $R^{133}$ independently denotes a substituent, $R^{130}$ and $R^{131}$ may bond together to form a ring structure, $R^{132}$ and $R^{133}$ may bond together to form a ring structure, and n3 denotes an integer of equal to or greater than 0.

14. The optical information recording medium according to claim 11, wherein the cationic dye has a maximum absorption wavelength at a wavelength range of 385 to 450 nm.

15. The optical information recording medium according to claim 1, wherein the recording layer further comprises a neutral dye that is a complex of an azo compound denoted by general formula (G) below and a metal ion or a metal oxide ion:

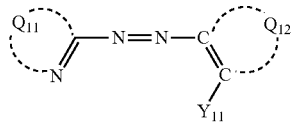

General formula (G)

wherein, in general formula (G), $Q^{11}$ denotes an atom group forming a nitrogen-containing hetero ring, $Q^{12}$ denotes an atom group forming a hetero ring or a carbon ring, and $Y^{11}$ denotes a group containing a hydrogen atom that may dissociate during formation of the complex.

16. An azo metal complex dye, which is denoted by general formula (C) below:

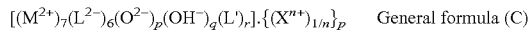
General formula (C)

wherein, in general formula (C), $M^{2+}$ denotes a divalent transition metal ion, $L^{2-}$ denotes a divalent anion that is the azo dye denoted by general formula (1) below from which two hydrogen atoms have dissociated, each of p and q denotes an integer ranging from 0 to 2, with p+q=2, $X^{n+}$ denotes a cation of valence n, with n denoting an integer ranging from 1 to 10, L' denotes a ligand, and r denotes an integer ranging from 0 to 5:

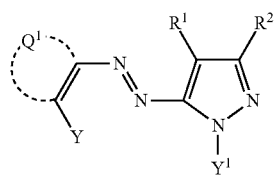
General formula (1)

wherein, in general formula (1), $Q^1$ denotes an atom group forming a heterocyclic ring or a carbon ring with two adjacent carbon atoms, Y denotes a group comprising a hydrogen atom that may dissociate during formation of the azo metal complex dye, $R^1$ and $R^2$ each independently denote a hydrogen atom or a substituent, and $Y^1$ denotes a hydrogen atom that may dissociate during formation of the azo metal complex dye.

17. The azo metal complex dye according to claim 16, wherein the following partial structure:

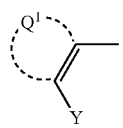

in general formula (1) is a partial structure denoted by general formula (B) below:

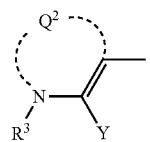
General formula (B)

wherein, in general formula (B), Y is defined as in general formula (1), $Q^2$ denotes an atom group forming a nitrogen-containing hetero ring with an adjacent nitrogen atom, an adjacent carbon atom and a carbon atom bonded to the group denoted by Y, and $R^3$ denotes an aryl group or a heteroaryl group.

18. The azo metal complex dye according to claim 17, wherein, in general formula (C), $L^{2+}$ denotes a divalent anion that is an azo dye denoted by general formula (2) from which two hydrogen atoms have dissociated:

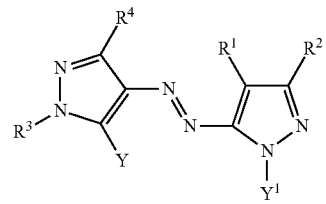
General formula (2)

wherein, in general formula (2), $R^1$, $R^2$, $Y^1$ and Y are defined respectively as in general formula (1), $R^3$ is defined as in general formula (B), and $R^4$ denotes a hydrogen atom or a substituent.

19. The azo metal complex dye according to claim 16, wherein the transition metal ion is a copper ion.

20. The azo metal complex dye according to claim 16, wherein, in general formula (C), $X^{n+}$ denotes an cation denoted by any of general formulas (D) to (F) below:

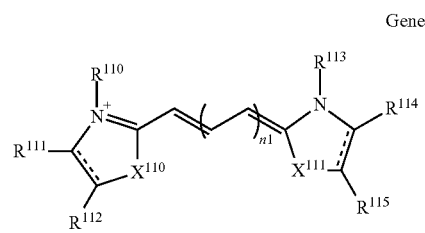
General formula (D)

wherein, in general formula (D), each of $R^{110}$, $R^{111}$, $R^{112}$, $R^{113}$, $R^{114}$, and $R^{115}$ independently denotes a hydrogen atom or a substituent, $R^{111}$ and $R^{112}$ may bond together to form a ring structure, $R^{114}$ and $R^{115}$ may bond together to form a ring structure, each of $X^{110}$ and $X^{111}$ independently denotes a carbon atom, oxygen atom, nitrogen atom, or sulfur atom, and n1 denotes an integer of equal to or greater than 0:

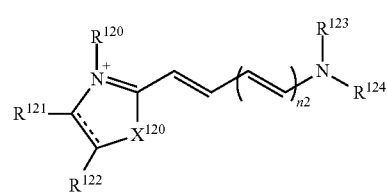
General formula (E)

wherein, in general formula (E), each of $R^{120}$, $R^{121}$, and $R^{122}$ independently denotes a hydrogen atom or a substituent, $R^{121}$ and $R^{122}$ may bond together to form a ring structure, each of $R^{123}$ and $R^{124}$ independently denotes a substituent and may bond together to form a ring structure, $X^{120}$ independently denotes a carbon atom, oxygen atom, nitrogen atom, or sulfur atom, and n2 denotes an integer of equal to or greater than 0:

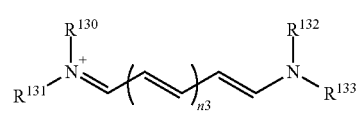
General formula (F)

wherein, in general formula (F), each of $R^{130}$, $R^{131}$, $R^{132}$, and $R^{133}$ independently denotes a substituent, $R^{130}$ and $R^{131}$ may bond together to form a ring structure, $R^{132}$ and $R^{133}$ may bond together to form a ring structure, and n3 denotes an integer of equal to or greater than 0.

\* \* \* \* \*